(12) United States Patent
Koyama et al.

(10) Patent No.: US 6,226,118 B1
(45) Date of Patent: *May 1, 2001

(54) OPTICAL MICROSCOPE

(75) Inventors: Kenichi Koyama, Sagimihara; Atsuhiro Tsuchiya, Hachioji; Masaru Fujiwara, Ina; Sadashi Adachi, Hachioji, all of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,064

(22) Filed: Jun. 16, 1998

(30) Foreign Application Priority Data

Jun. 18, 1997 (JP) .................................................. 9-161299
Jul. 10, 1997 (JP) .................................................. 9-185015

(51) Int. Cl.⁷ .................................................. G02B 21/00
(52) U.S. Cl. ......................... 359/380; 359/388; 359/379; 359/385; 359/821
(58) Field of Search .................................... 359/370, 374, 359/379, 381, 384, 385, 388, 391, 656, 661, 821

(56) References Cited

U.S. PATENT DOCUMENTS 4,697,893 * 10/1987 Fehr et al. .................... 350/516
5,296,703 * 3/1994 Tsien .................................... 359/368
5,808,791 * 9/1998 Kawano et al. ..................... 359/368

FOREIGN PATENT DOCUMENTS

| | | |
|---|---|---|
| 63-133115 | 6/1988 | (JP) . |
| 6-4720 * | 1/1994 | (JP) .................. G02B/7/14 |
| 6-109962 | 4/1994 | (JP) . |
| 6-40910 | 5/1994 | (JP) . |
| 7-311342 | 11/1995 | (JP) . |
| 8-338940 | 12/1996 | (JP) . |
| 9-54253 | 2/1997 | (JP) . |

* cited by examiner

Primary Examiner—Darren Schuberg
Assistant Examiner—Fayez Assaf
(74) Attorney, Agent, or Firm—Frishauf, Holtz, Goodman, Langer & Chick, P.C.

(57) ABSTRACT

An optical microscope has a revolver for selectively inserting a plurality of objective lenses including a low-magnification (very-low-magnification) objective lens on an optical axis for observation light. In fluorescence observation using the low-magnification objective lens, the effective diameter of an observation optical system is set larger than that of an illumination optical system. With this arrangement, fluorescence observation using the low-magnification objective lens can be stably performed. A cube unit having a plurality of cubes corresponding to the respective microscopic methods is arranged in the optical microscope. An auxiliary lens serving as a very-low-magnification objective lens is mounted in this cube unit. The auxiliary lens can be automatically used in observation using the very-low-magnification objective lens. With this arrangement, a compact optical microscope excellent in operability can be realized.

14 Claims, 13 Drawing Sheets

OPTICAL MICROSCOPE

BACKGROUND OF THE INVENTION

The present invention relates to an optical microscope having an objective lens interchanging mechanism.

When observing a specimen such as a vital cell, observation is performed while manipulating the specimen with a manipulator and measuring the potential with an electrode. In this case, the entire portion of the specimen is observed with a low-magnification objective lens to determine the portion to be observed. Thereafter, the low-magnification lens is switched to a high-magnification lens, and observation is performed in detail.

Conventionally, an optical microscope having an objective lens interchanging mechanism is proposed in order to use, by switching, objective lenses having different magnifications in this manner. For example, optical microscopes disclosed in Jpn. UM Appln. KOKAI Publication No. 6-40910 and No. 6-4720 and Jpn. Pat. Appln. KOKAI Publication No. 8-338940 are known. In each of these optical microscopes, a plurality of objective lenses having the same mount screw diameter that complies with the international standards (parfocal distance: 45 mm; mount screw diameter W: 20.32; and thread height: 36) and different magnifications are mounted to the support. An objective lens having an optimum magnification can be inserted on the observation optical axis in accordance with a change in observation magnification.

When the objective lenses are to be used in fluorescence observation by switching their magnification in this manner, as a low-magnification objective lens for observing the entire portion of the specimen, one having a magnification as low as possible is usually preferable. Conventionally, the lower limit of the magnification that can be employed is about 10x. This is because the lower the magnification, the darker the observation image. To observe a fluorescent image which is originally dark, the magnification must be at least about 10x. If not, observation becomes impossible.

To allow fluorescence observation at a low magnification, the observation image must be made bright. The fluorescent intensity may be increased by increasing the intensity of excitation light. If the intensity of the excitation light is excessively increased, the specimen may be damaged or discolored with fluorescence, causing a trouble in observation.

To eliminate this, as a low-magnification objective lens, for example, one having a magnification lower than 10x and capable of ensuring a sufficiently high brightness for the observation image may be used. According to the optical microscope having the objective lens interchanging mechanism described above, the objective lenses to be mounted to the support must comply with the same standards and have the same mount screw diameter. If the objective lenses have different mount screw diameters, they cannot be mounted to the objective lens interchanging mechanism simultaneously and cannot be interchangeably used. If the objective lenses have different parfocal distances, when they are replaced, the focal point is largely displaced from the specimen surface due to the parfocal difference, and focusing must be performed again, leading to inconveniences in use.

For this reason, an optical microscope which can stably perform fluorescence observation with a low-magnification objective lens is sought for. Particularly, the following requirements are desired. A conventional illumination optical system must be used to suppress an increase in manufacturing cost, the compactness of the microscope must be maintained, and the microscope must be excellent in operability.

The objective lens switching operation described above poses the following problems.

Generally, in a microscope, a plurality of objective lenses are detachably held by an objective lens revolver which performs a switching operation among the plurality of objective lenses such that they can be inserted in and removed from the observation optical axis. Observation at a desired magnification is performed by turning the objective lens revolver to switch the objective lens on the observation optical axis.

In a microscope, since the height of eye point (the distance from the desktop surface to the operator's eye) with which the operator can perform observation with a natural posture is substantially fixed, the sizes of the respective portions of the microscope are limited. For example, the distance from the mounting surface of the objective lens, with which the objective lens is to be mounted to the objective lens revolver, to the sample surface (this distance will be referred to as the parfocal distance hereinafter) is usually designed to be about 45 mm. In an objective lens having a very low magnification of 1x or less, its parfocal distance is as very long as about 200 mm. If such an objective lens is used, its entire length cannot be accommodated within the parfocal distance. Therefore, it is impossible to change the observation magnification by only turning the objective lens revolver to switch the objective lens.

In order to solve this problem, conventionally, a microscope disclosed in Jpn. Pat. Appln. KOKAI Publication No. 9-54253 is known. According to this reference, one of a plurality of first objective lenses is defined as a very-low-magnification objective lens. The second objective lens fixed in an optical path is arranged with respect to a revolver means that performs a switching operation among the plurality of first objective lenses so that the selected one is located in the optical path. An observation image of an object is formed through the first objective lens selected by the revolver means and the second objective lens. A very-low-magnification auxiliary lens, which is to be inserted in an interlocked manner with selection of the very-low-magnification objective lens done by the revolver means, is arranged in the optical path between the first and second objective lenses. The first very-low-magnification objective lens is constituted by the very-low-magnification auxiliary lens and the very-low-magnification objective lens. More specifically, the very-low-magnification objective lens, the entire length of which cannot be accommodated within the parfocal distance, is divided into two portions, i.e., the first objective lens mounted to the revolver means, and the very-low-magnification auxiliary lens, and is constituted such that its synthetic focal distance becomes about 200 mm. The observation magnification, including the very low magnification, can be changed by inserting and removing the very-low-magnification auxiliary lens in and from the optical path in an interlocked manner with selection of the very-low-magnification objective lens by the revolver means.

In the microscopes disclosed in the above references, merely the very-low-magnification auxiliary lens is arranged in the optical path between the first and second objective lenses, and no description is made concerning the practical arrangement of the very-low-magnification auxiliary lens. For this reason, (1) For example, when an extra space is newly prepared exclusively for the very-low-magnification auxiliary lens, not only the eye point described above becomes high, but also the entire microscope becomes large.

(2) The switching mechanism for inserting and removing the very-low-magnification auxiliary lens in and from the optical path must be prepared exclusively for the very-low-magnification objective lens, and must be interlocked with the turning operation of the revolver means. This leads to a complicated arrangement and an increase in cost, which is not preferable.

(3) Although the observation magnification can be changed, the microscopic method must be switched by separately providing a switching mechanism, resulting in a degradation in operability.

Generally, a very-low-magnification objective lens has a long focal distance and a large radius of lens curvature. Particularly, when performing observation with reflected light, noise such as flare, ghost, or the like which affects original image formation tends to be caused by repeated surface reflection of the lens. In order to solve this, in general, a polarizer is inserted in the reflected light optical system, an analyzer is inserted, in an observation optical system, behind (image side) an objective lens and behind (image side) a half mirror that coaxially introduces the reflected light optical axis into the observation optical axis, and a λ/4 plate and a depolarizer are inserted in the distal end (closest to the sample) of the objective lens. When a high-magnification objective lens is employed, the influence of the flare or ghost is small. In this case, the polarizer, the analyzer, the λ/4 plate, and the depolarizer need not be used or are better be omitted as they decrease brightness. If the λ/4 plate and the depolarizer are mounted to the distal end of the very-low-magnification objective lens mounted to the revolver means, they can be inserted or removed upon the turning operation of the revolver means, thus solving the problem.

(4) Even with this arrangement, since the polarizer and analyzer are left inserted in the optical path, a mechanism is necessary which inserts them in the optical path for very-low-magnification observation and removes them from the optical path for other observation. This leads to a cumbersome operation and complicated arrangement, leading to an increase in cost.

Jpn. Pat. Appln. KOKAI Publication No. 6-109962 discloses a prior art in which an objective lens revolver is turned electrically. To turn the revolver electrically itself is a known technique, and the revolver is not interlocked with a movable portion which is necessary for other microscopic method switching and the like. As disclosed in Jpn. Pat. Appln. KOKAI Publication No. 7-311342 and No. 63-133115, a technique is known which improves the operability by interlocking insertion/removal of optical elements and the like, required for performing a switching operation among various types of microscopic methods, light control, a stop, a cube, and the like. However, no description is made concerning two types of objective lenses which are inserted in and removed from the optical path in an interlocked manner during magnification switching. Also, no description is made concerning an objective lens for magnification switching, which is inserted in and removed from the optical path with the same drive member as that employed for microscopic method switching. Hence, problems similar to those of Jpn. Pat. Appln. KOKAI Publication No. 9-54253 exist.

From the above reasons, an optical microscope which solves the various problems described above is sought for.

BRIEF SUMMARY OF THE INVENTION

Accordingly, it is an object of the present invention to provide a compact, high-operability optical microscope.

It is another object of the present invention to provide an optical microscope which can stably perform fluorescence observation with a low-magnification objective lens.

According to a first aspect of the present invention, there is provided an optical microscope comprising: a light source for emitting illumination light; an illumination optical system for irradiating a specimen with the illumination light from the light source; objective lens switching means for selectively inserting a plurality of objective lenses including a low-magnification objective lens on an optical axis of observation light from the specimen and positioning the plurality of objective lenses; and an observation optical system for observing the specimen through one of the plurality of objective lenses, wherein an effective diameter of the observation optical system in observing the specimen through the low-magnification objective lens is larger than that of the illumination optical system.

With the above arrangement, the brightness of the observation image of the fluorescent specimen can be increased, and fluorescence observation is allowed at a lower magnification. The effective diameter of the illumination optical system need not be increased and can be equal to that of the conventional case. The intensity of excitation light does not change to prevent damage to the specimen and its discoloration. In addition, any conventional illumination optical system can be used without any modification, resulting in an advantage in the manufacture. The size of only the observation optical system is increased, thereby contributing to downsizing of the microscope.

In the optical microscope, the low-magnification objective lens may be a large-diameter objective lens having a pupil diameter corresponding to the effective diameter of the illumination optical system.

In the optical microscope, the plurality of objective lenses may include an ordinary objective lens having a pupil diameter corresponding to the effective diameter of the illumination optical system.

In the optical microscope, the mount lens diameters of the plurality of objective lenses in the objective lens switching means may be different.

In the optical microscope, the height of the mount surface of each objective lens can be adjusted so as to maintain parfocal states in accordance with the parfocal distances of the objective lenses.

The optical microscope further comprises a mirror unit having an excitation filter, a dichroic mirror, and an absorbing filter, all of which are commonly inserted in the illumination optical system and the observation optical system. The excitation filter may have a size matching the effective diameter of the illumination optical system. The dichroic mirror and the absorbing filter may have a size matching the effective diameter of the observation optical system.

In the optical microscope, the mount screw diameters of the plurality of objective lenses in the objective lens switching means are equal to each other. The objective lens switching means can adjust the height of the mount surface of each objective lens so that the parfocal states are maintained in accordance with the parfocal distances of the objective lenses.

In the optical microscope, the low-magnification objective lens preferably has a magnification of 5× or less.

In the optical microscope, the specimen is preferably a fluorescent specimen which generates fluorescence.

According to a second aspect of the present invention, there is provided an optical microscope comprising: objective lens switching means for selectively inserting a plurality of objective lenses including a first objective lens on an observation optical axis for a specimen and positioning the plurality of objective lenses; and cube switching means for selectively and detachably positioning a plurality of cubes on the observation optical axis, the plurality of cubes including a cube having a mirror unit corresponding to each microscopic method and a cube having a second objective lens serving as an auxiliary lens used with the first objective lens.

With the above arrangement, an exclusive space for the second objective lens need not be formed to achieve space saving, thereby providing a compact microscope.

In the optical microscope, the first objective lens is preferably a very-low-magnification objective lens.

In the optical microscope, the cube switching means is preferably interlocked with the switching operation of the objective lens switching means. More specifically, when the first objective lens is positioned on the observation optical axis, the second objective lens is preferably positioned on the observation optical axis.

The optical microscope may further comprise an objective lens position detection sensor for detecting positions of the plurality of objective lenses, a cube position detection sensor for detecting positions of the plurality of cubes, and a processor for controlling an interlocking operation between the objective lens switching means and the cube switching means by referring to the detected positions of the objective lenses and cubes.

In the optical microscope, the second objective lens may be detachable from the cube switching means.

In the optical microscope, the cube switching means may have a turret for detachably fixing the plurality of cubes. In this case, the second objective lens may be detachably mounted in the turret.

In the optical microscope, the second objective lens may be integrally arranged with the cubes together with a polarizer for selectively transmitting illumination light from a light source, a beam splitter for reflecting light transmitted through the polarizer toward a sample surface and transmitting observation light from the sample surface, and an analyzer for selectively transmitting the light transmitted through the beam splitter.

In the optical microscope, the cube having the mirror unit may be a cube for fluorescence observation.

In the optical microscope, the cube having the mirror unit may be a cube for polarized light observation.

In the optical microscope, the cube having the mirror unit is a cube for bright field observation.

In the optical microscope, the cube having the mirror unit is a cube for dark field observation.

In the optical microscope, the second objective lens serving as the auxiliary lens and the mirror unit can be simultaneously inserted on the observation optical axis.

The optical microscope may further comprise a light source for emitting reflected light. In this case, the second objective lens serving as the auxiliary lens may be arranged in a specimen side with respect to an optical axis of the reflected light emitted by the light source.

The optical microscope may further comprise a light source for emitting reflected light. In this case, the second objective lens serving as the auxiliary lens may be arranged in an observation image obtaining side with respect to an optical axis of the reflected light emitted by the light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described with reference to the accompanying drawing.

[First Embodiment]

Figure 1:
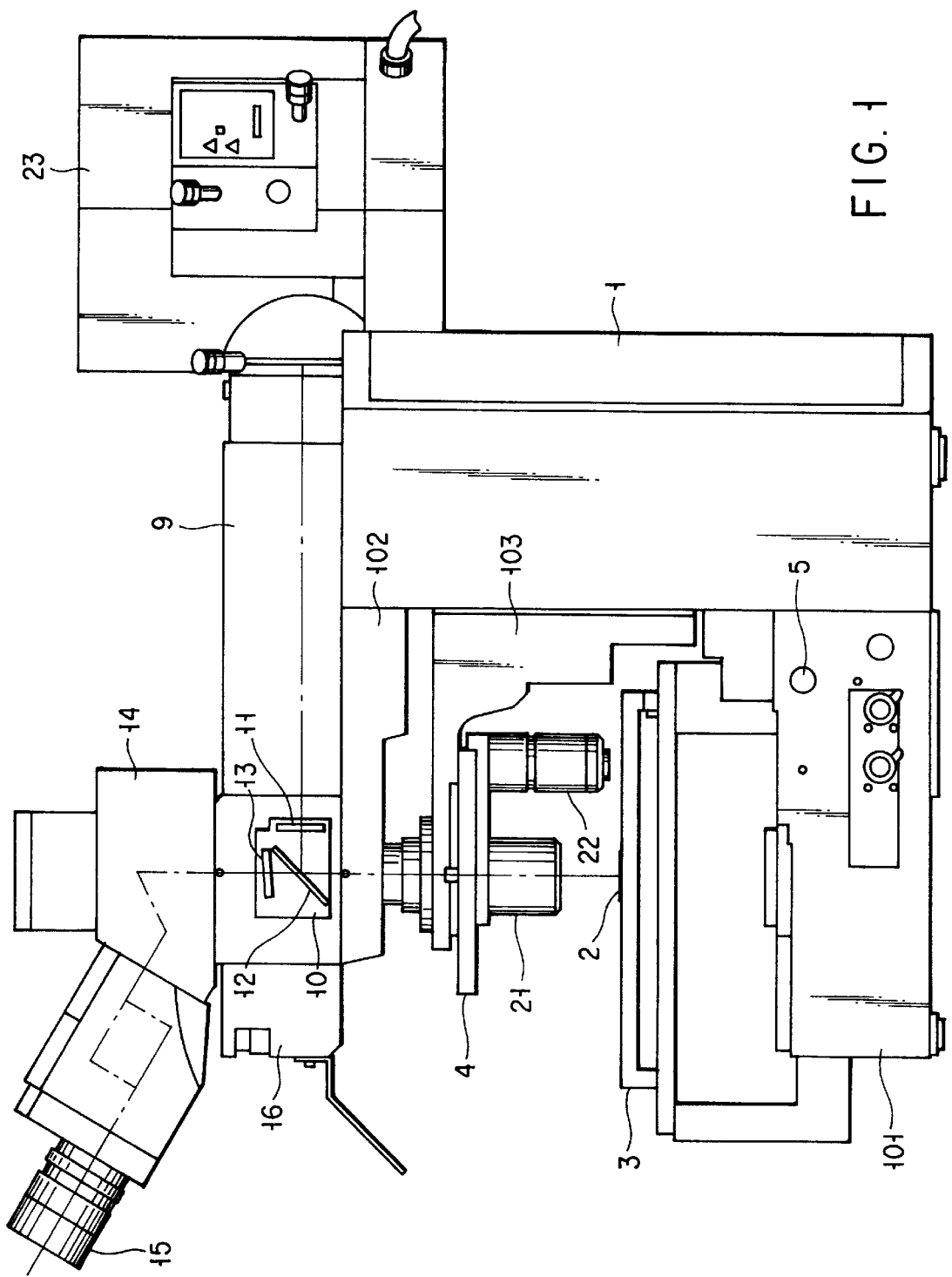
FIG. 1 is a view showing the schematic arrangement of a reflected light fluorescence microscope applied to the first embodiment of the present invention.

FIG. 1 shows the schematic arrangement of a reflected light fluorescence microscope applied to the first embodiment of the present invention. Referring to FIG. 1, reference numeral 1 denotes a microscope main body. The microscope main body 1 has an arm 102 projecting parallel to a base 101.

A stage 3 where a specimen 2 is placed is formed on the base 101 of the microscope main body 1. While the specimen 2 is placed on it, the stage 3 can be moved in an X-Y direction within a plane perpendicular to the observation optical axis.

A focusing unit 103 supports an objective lens interchanging mechanism 4. The objective lens interchanging mechanism 4 can be vertically moved along the observation optical axis by rotating a knob 5 provided to the base 101 of the microscope main body 1.

Objective lenses 21 and 22 are mounted to the objective lens interchanging mechanism 4. The objective lenses 21 and 22 can be selectively inserted in and positioned on the observation optical axis for the specimen 2 on the stage 3.

In this case, the objective lens 21 is a low-magnification (about 5× or less), large-diameter lens having a large exit pupil, and the objective lens 22 is an ordinary lens which complies with the international standards. An ordinary lens with a magnification of 4× has a parfocal distance of 45 mm, a mount screw diameter W of 20.32, a thread of 36, and NA=0.16, while a large-diameter lens with a magnification of 4× has a parfocal distance of 60 mm, a mount screw diameter M of 35×1, and NA=0.28. An ordinary lens with a magnification of 2× has a parfocal distance of 45 mm, a mount screw diameter W of 20.32, a thread of 36, and NA=0.08, while a large-diameter lens with a magnification of 2× has a parfocal distance of 60 mm, a mount screw diameter M of 35×1, and NA=0.14. The calculation values indicate that in each of the 4× and 2× lenses, a lens having a larger diameter than that of an ordinary lens has a brightness 3 times that of the ordinary lens (the brightness is proportional to 20% NA). Concerning the large-diameter objective lens 21, its parfocal distance and mount screw diameter may be changed and the NA value may be set such that the brightness becomes 2 to 4 times.

A turret 16 having a lamp housing 23, a light projection tube 9, and a mirror unit 10 is arranged on the arm 102. The lamp housing 23 emits illumination light serving as the illumination source. The light projection tube 9 guides the illumination light from the lamp housing 23 and has at least one lens (not shown) for optimizing the illumination light. The mirror unit 10 has an excitation filter 11, a dichroic mirror 12, and an absorbing filter 13. The excitation filter 11 selects only a light component in a necessary wavelength range of the illumination light. The dichroic mirror 12 bends the optical path. The absorbing filter 13 removes a disturbing light beam from fluorescence generated by the specimen.

A lens barrel 14 and an eyepiece 15 are arranged above the mirror unit 10.

Figure 2:
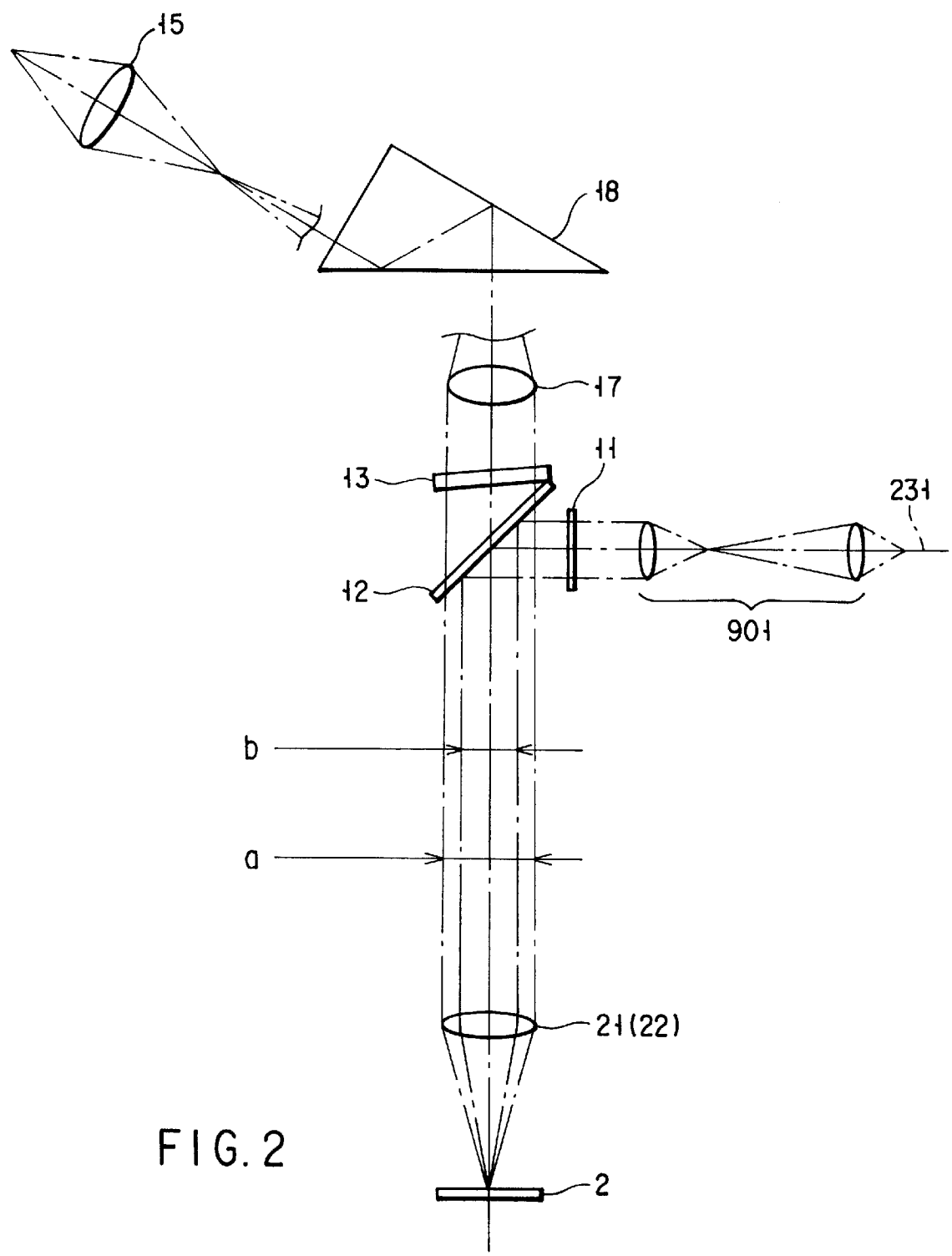
FIG. 2 is a view schematically showing the optical path of the reflected light fluorescence microscope applied to the first embodiment.

FIG. 2 shows the schematic diagram of the optical path of the reflected light fluorescence microscope having this arrangement. Illumination light 231 emitted from the lamp housing 23 passes through an optical system 901 of the light projection tube 9, is reflected by the dichroic mirror 12 through the excitation filter 11, passes through the objective lens 21 (22) which is inserted in and positioned on the observation optical axis by the objective lens interchanging mechanism 4, and irradiates the specimen 2 on the stage 3. Observation fluorescence generated by the specimen 2 passes through the objective lens 21 (22) again and the absorbing filter 13 to get rid of the disturbing light beam through the absorbing filter 13, and is converted by a tube lens 17 to be observed through the lens barrel 14 and eyepiece 15.

Accordingly, while the low-magnification objective lens 21-having a large exit pupil is inserted in and positioned on the observation optical axis, an effective diameter a of the observation optical system which is generated by the specimen 2 and obtained through the objective lens 21 is larger than an effective diameter b of the illumination optical system constituted by the illumination light 231.

Figure 3:
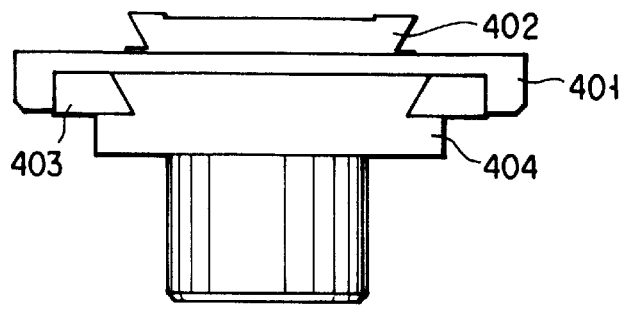
FIG. 3 is a view showing the schematic arrangement of the objective lens interchanging mechanism of the reflected light fluorescence microscope applied to the first embodiment.
Figure 4:
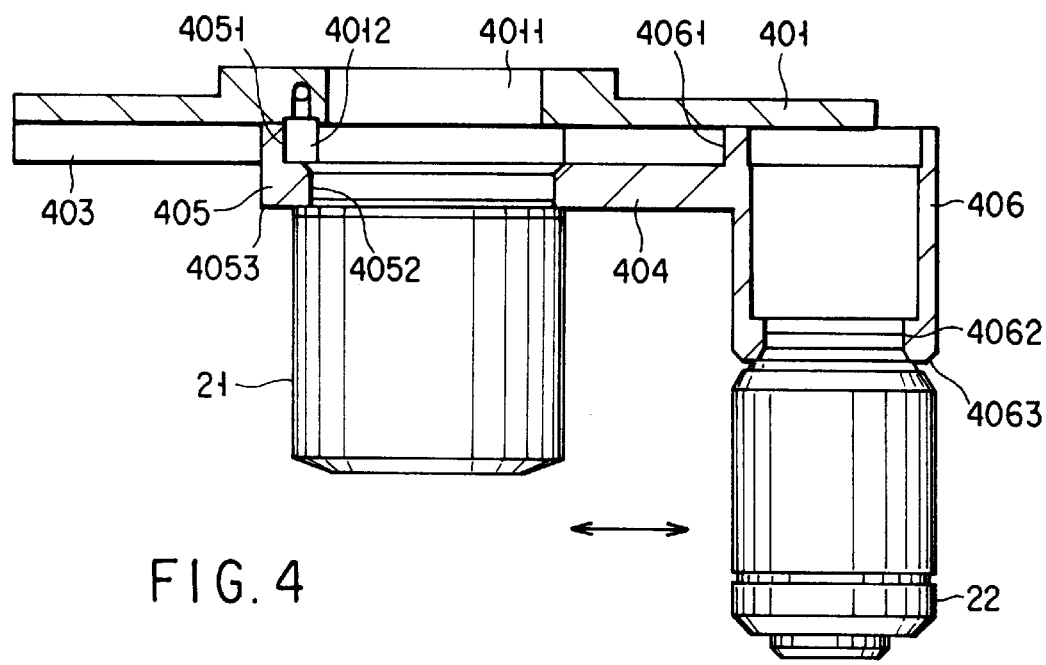
FIG. 4 is a view showing the schematic arrangement of the objective lens interchanging mechanism of the reflected light fluorescence microscope applied to the first embodiment.

FIGS. 3 and 4 show the schematic arrangement of the objective lens interchanging mechanism 4 applied to such a reflected light fluorescence microscope.

Referring to FIGS. 3 and 4, reference numeral 401 denotes the stationary portion of the objective lens interchanging mechanism 4. A dovetail 402 is formed on the upper surface of the stationary portion 401. The stationary portion 401 can be mounted to and removed from the arm 102 described above through the dovetail 402. The stationary portion 401 has a dovetail groove 403 in its lower surface. A movable portion 404 is arranged to be linearly movable along the dovetail groove 403 in the direction of a double-headed arrow shown in FIG. 4.

The movable portion 404 has lens mount portions 405 for the two objective lenses 21 and 22, respectively. When the movable portion 404 is linearly moved, the lens mount portions 405 and 406 can be selectively set to coincide with an opening 4011 on the observation optical axis of the stationary portion 401. In this case, a stopper 4012 is arranged in the stationary portion 401. When the lens mount portion 405 or 406 of the movable portion 404 is located on the observation optical axis, a side surface 4051 or 4061 of the lens mount portion 405 or 406 abuts against the stopper 4012. FIG. 4 shows a state wherein the side surface 4051 of the lens mount portion 405 abuts against the stopper 4012.

The objective lenses 21 and 22 having different screw diameters and different parfocal distances can be mounted to the lens mount portions 405 and 406, respectively, of the movable portion 404. Of the lens mount portions 405 and 406, the lens mount portion 405 has a mount screw portion 4052 with such a mount screw diameter that the objective lens 21, the mount screw diameter of which is increased to set a large NA and the parfocal distance of which is increased in order to increase the working distance, can be mounted to it as the low-magnification large-diameter objective lens having a large exit pupil. The lens mount portion 406 has a mount screw portion 4062 with a mount screw diameter that complies with the international standards, so that the ordinary objective lens 22 can be mounted to it. Furthermore, the lens mount portions 405 and 406 respectively have objective lens mounting surfaces 4053 and 4063 having a step difference corresponding to the parfocal difference between the objective lenses 21 and 22. Even when a switching operation is performed between the objective lenses 21 and 22 having different parfocal distances, the parfocal state is maintained.

Figure 5:
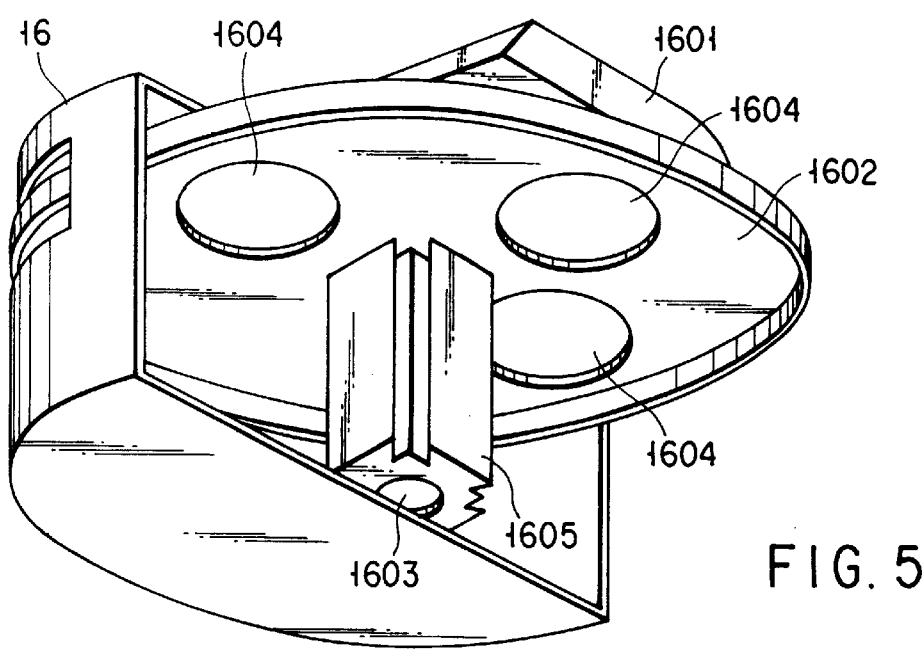
FIG. 5 is a view showing the schematic arrangement of the turret of the reflected light fluorescence microscope applied to the first embodiment.
Figure 6:
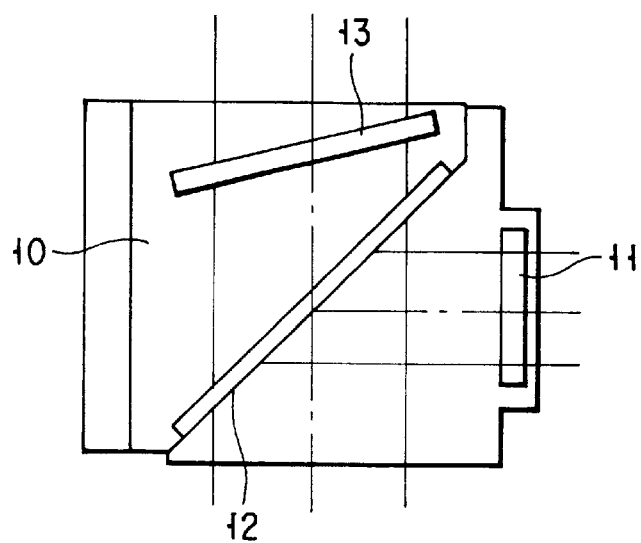
FIG. 6 is a view showing the schematic arrangement of the mirror unit of the turret of the reflected light fluorescence microscope applied to the first embodiment.
Figure 7:
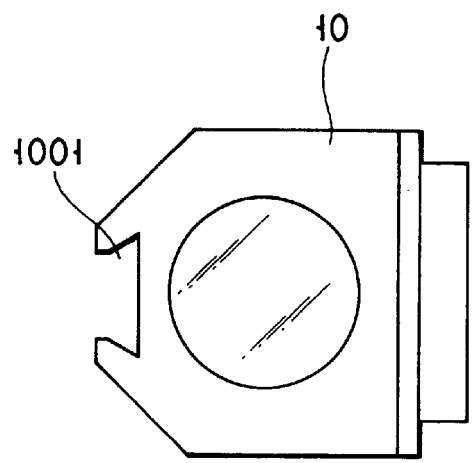
FIG. 7 is a view showing the schematic arrangement of the mirror unit of the turret of the reflected light fluorescence microscope applied to the first embodiment.

FIGS. 5 to 7 show the schematic arrangement of the turret 16 having the mirror unit 10.

In this case, the turret 16 shown in FIG. 5 can be detachably mounted to the light projection tube 9 described above through a mount portion 1601. The turret 16 has a rotatable body 1602, and has a vertical shaft 1603 at the center of the rotatable body 1602. The rotatable body 1602 has a plurality of openings 1604. Dovetails 1605 on which a plurality of mirror units 10 are to be mounted are formed around the vertical shaft 1603.

Each mirror unit 10 has the excitation filter 11, the dichroic mirror 12, and the absorbing filter 13, as shown in FIG. 6, and has a dovetail groove 1001 in its side surface, as shown in FIG. 7. When the dovetail groove 1001 is fitted with a corresponding one of the dovetails 1605 of the vertical shaft 1603, the plurality of mirror units 10 are mounted on the rotatable body 1602 of the turret 16. In this state, when the vertical shaft 1603 is rotated together with the rotatable body 1602, a desired mirror unit 10 can be located on the observation optical axis.

In the mirror unit 10 shown in FIG. 6, the diameter of the excitation filter 11 located in the illumination optical axis having the effective diameter b, and the diameters of the dichroic mirror 12 and absorbing filter 13 located in the observation optical axis having the effective diameter a are different from each other.

The operation of the embodiment having the above arrangement will be described.

In this case, the objective lenses 21 and 22 are fixed by respectively screwing them in and causing them to abut against the mount screw portions 4052 and 4062 of the lens mount portions 405 and 406 of the movable portion 404, and the movable portion 404 is mounted on the focusing unit 103 of the microscope main body 1 through the dovetail 402. The rotatable body 1602 of the turret 16 is rotated to locate the desired mirror unit 10 on the observation optical axis.

In this state, the movable portion 404 is linearly moved. The side surface 4051 of the lens mount portion 405 of the objective lens 21 is abutted against the stopper 4012 to position the low-magnification objective lens 21 having a large exit pupil on the observation optical axis.

The illumination source of the lamp housing 23 is turned on. The knob 5 is operated to vertically move the objective lens interchanging mechanism 4 along the observation optical axis, thereby adjusting the focal point of the objective lens 21 to coincide with the specimen 2. In this state, the illumination light 231 from the lamp housing 23 passes through the optical system 901, and is reflected by the dichroic mirror 12 through the excitation filter 11, to irradiate the specimen 2 through the objective lens 21. Observation fluorescence generated by the specimen 2 passes through the objective lens 21 again and the absorbing filter 13, and serves for reflected light fluorescence observation through the lens barrel 14 and eyepiece 15.

The movable portion 404 is linearly moved in the direction opposite to that described above to cause the side surface 4061 of the lens mount portion 406 of the objective lens 22 to abut against the stopper 4012, so that the ordinary objective lens 22 is positioned on the observation optical axis. At this time, reflected light fluorescence observation through the objective lens 22 is to be performed. When the microscopic method is to be changed, the rotatable body 1602 of the turret 16 may be operated to locate a desired mirror unit 10 on the observation optical axis.

In this manner, the illumination light 231 emitted from the lamp housing 23 irradiates the specimen 2 on the stage 3 through the illumination optical system having the light projection tube 9 and excitation filter 11. Observation fluorescence generated by the specimen 2 is converted to be observed through the observation optical system having the objective lenses 21 and 22, which are selectively inserted in and positioned on the observation optical system by the objective lens interchanging mechanism 4, the dichroic mirror 12, and the absorbing filter 13. The effective diameter a of the observation optical system, which is obtained when the low-magnification objective lens 21 having a large exit pupil is inserted in and positioned on the observation optical axis, is set to be larger than the effective diameter b of the illumination optical system. Since the effective diameter a of the observation optical system is set large, the brightness of the observation image of the fluorescent specimen 2 can be increased, and fluorescence observation at a low magnification is allowed. Regarding the illumination optical system, the effective diameter is not increased but is left at the same value as in the conventional case. Since the intensity of the excitation light is not changed accordingly, damage, or degradation in discoloration, of the specimen can be prevented. The light projection tube 9 and excitation filter 11 of the conventional illumination optical system can be used unchanged, which is advantageous in the manufacture. Only the size of the observation optical system need be increased, contributing to downsizing of the microscope.

The ordinary objective lens 22 having a pupil corresponding to the effective diameter b of the illumination optical system, and the large-diameter objective lens 21 having a pupil corresponding to the effective diameter a of the observation optical system, may be mounted to the same objective lens interchanging mechanism 4, and can be selectively used.

In the objective lens interchanging mechanism 4, the objective lens mounting surfaces 4053 and 4063 are respectively set such that the objective lenses 21 and 22 can be detachably mounted in the mount screw portions 4052 and 4062 having different mount screw diameters and that the parfocal states of the objective lenses 21 and 22 are maintained in accordance with the parfocal distances of the objective lenses 21 and 22. Even when the large-diameter objective lens 21 has a parfocal distance different from that of the ordinary objective lens 22 for optimal design, the objective lenses 21 and 22 can be mounted to the same objective lens interchanging mechanism 4 and a switching operation can be performed between them while their parfocal states are maintained, thus eliminating focusing upon the switching operation.

The mirror units 10 prepared to match all the interchangeable objective lenses 21 and 22 need not be introduced from the outside upon switching the objective lens, thereby simplifying replacement of the mirror unit 10. The switching operation between the objective lenses 21 and 22 is a slide operation in the back-and-forth direction when seen from the operator. Hence, a large left-to-right space can be ensured for the objective lens. Also, an objective lens vertical moving method that vertically moves the objective lens interchanging mechanism 4 is employed in the microscope main body 1. Since the position of the specimen 2 is fixed, this arrangement is optimum for an application such as a manipulator.

The microscope main body 1 is formed into a U-letter shape in which the arm 102 projects parallel to the base 101. Therefore, the microscope main body 1 has a high rigidity and can be easily combined with a system such as a TV camera.

In the embodiment described above, the present invention is applied to a reflected light fluorescence microscope. The present invention can also be applied to a microscope other than this. In the above description, the heights of the barrel mount surfaces of the objective lenses are set such that a difference between the parfocal distances of the objective lenses 21 and 22 mounted to the objective lens interchanging mechanism 4 is canceled, and a switching operation is performed between the objective lenses 21 and 22 having different parfocal distances while the parfocal states are maintained. In this case, the mount screw diameters of the objective lenses 21 and 22 may be the same, while only their parfocal distances may be different. The parfocal distance of the objective lens 21 may be set to be equal to that of the objective lens 22, while only their mount screw diameter may be changed in accordance with the necessary luminous flux diameter. In the above description, in order to set the condition optimum for using a manipulator, the stage 3 is fixed, while the objective lenses 21 and 22 are vertically moved along the observation optical axis. However, the stage 3 side may be vertically moved along the observation optical axis. Furthermore, the mount screw portion 4052 of the lens mount portion 405 formed on the movable portion 404 is set to match the large-diameter objective lens 21. When an ordinary objective lens is to be used, an adapter may be mounted by using the mount screw portion 4052.

[Second Embodiment]

Figure 8:
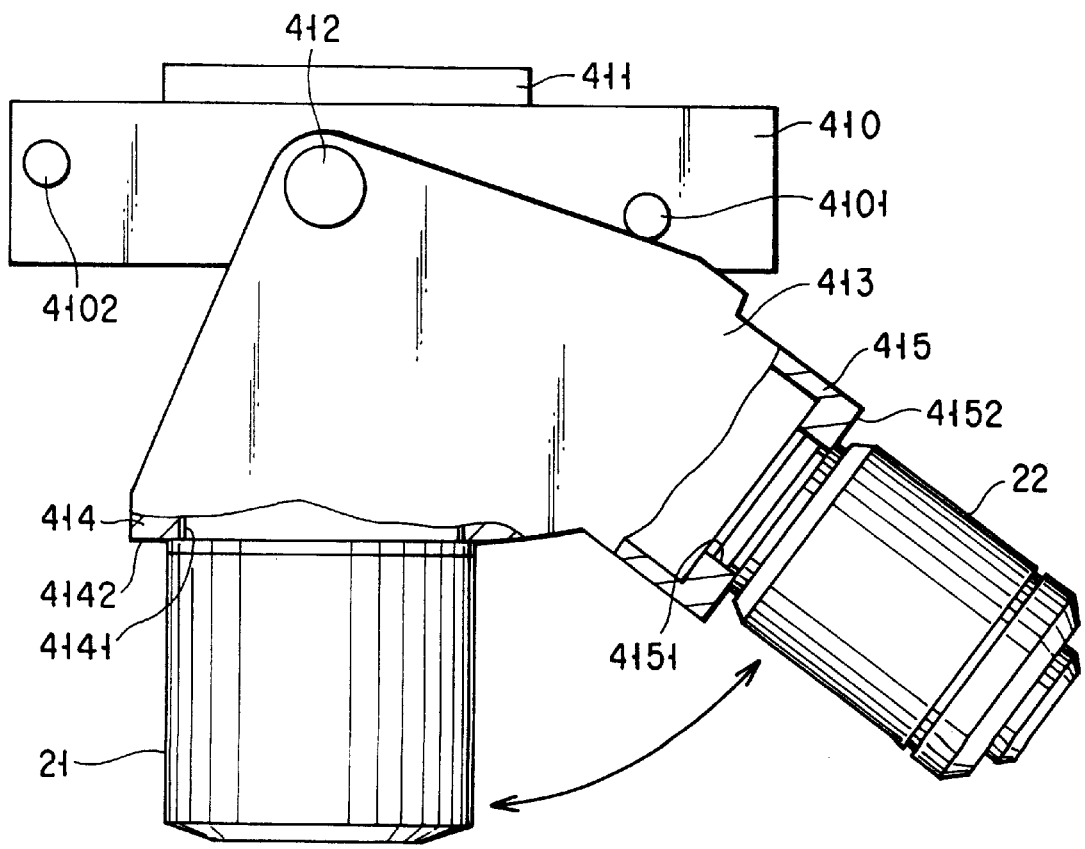
FIG. 8 is a view showing the schematic arrangement of the objective lens interchanging mechanism of a reflected light fluorescence microscope applied to the second embodiment of the present invention.

FIG. 8 shows the schematic arrangement of an objective lens interchanging mechanism 4 applied to the second embodiment of the present invention.

Referring to FIG. 8, reference numeral 410 denotes the stationary portion of the objective lens interchanging mechanism 4. A dovetail 411 is formed on the upper surface of the stationary portion 410. The objective lens interchanging mechanism 4 can be detachably mounted on a focusing unit 103 identical to that described above through the dovetail 411.

The stationary portion 410 is provided with a pivotal portion 413 which is pivotal about a shaft 412 as the center in the directions of a double-headed arrow in FIG. 8. The pivotal portion 413 has lens mount portions 414 and 415 for two objective lenses 21 and 22. When the pivotal portion 413 is pivoted, the lens mount portions 414 and 415 can be selectively set to coincide with the observation optical axis of the stationary portion 410. In this case, stoppers 4101 and 4102 are formed on the stationary portion 410. When the lens mount portion 414 or 415 is located on the observation optical axis, the side surface of the pivotal portion 413 abuts against the stopper 4101 or 4102. In FIG. 8, the side surface of the pivotal portion 413 abuts against the stopper 4101.

The objective lenses 21 and 22 having different screw diameters and different parfocal distances can be mounted to the lens mount portions 414 and 415, respectively, of the pivotal portion 413. Of the lens mount portions 414 and 415, the lens mount portion 414 has a mount screw portion 4141 with such a mount screw diameter that the objective lens 21, the mount screw diameter of which is increased to set a large NA and the parfocal distance of which is increased in order to increase the working distance, can be mounted to it as the low-magnification large-diameter objective lens having a large exit pupil. The lens mount portion 415 has a mount screw portion 4151 with a mount screw diameter that complies with the international standards, so that the ordinary objective lens 22 can be mounted to it. Furthermore, the lens mount portions 414 and 415 respectively have objective lens mounting surfaces 4142 and 4152 having a step difference corresponding to the parfocal difference between the objective lenses 21 and 22. Even when a switching operation is performed between the objective lenses 21 and 22 having different parfocal distances, the parfocal state is maintained.

The same effect as that of the first embodiment described above can be expected. Since a switching operation between the objective lenses 21 and 22 can be performed by only pivoting the pivotal portion 413, the arrangement of the objective lens interchanging mechanism 4 can be further simplified, and a stable switching operation can be obtained.

The mount screw portion 4141 of the lens mount portion 414 formed on the pivotal portion 413 is set to match the large-diameter objective lens 21. When an ordinary objective lens is to be used, an adapter may be mounted by using the mount screw portion 4141.

[Third Embodiment]

Figure 9:
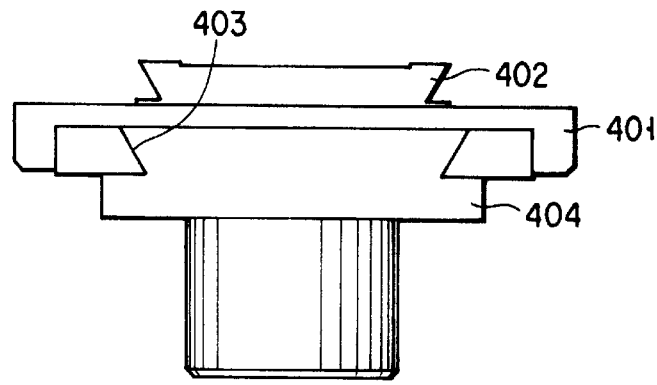
FIG. 9 is a view showing the schematic arrangement of the objective lens interchanging mechanism of a reflected light fluorescence microscope applied to the third embodiment of the present invention.
Figure 10:
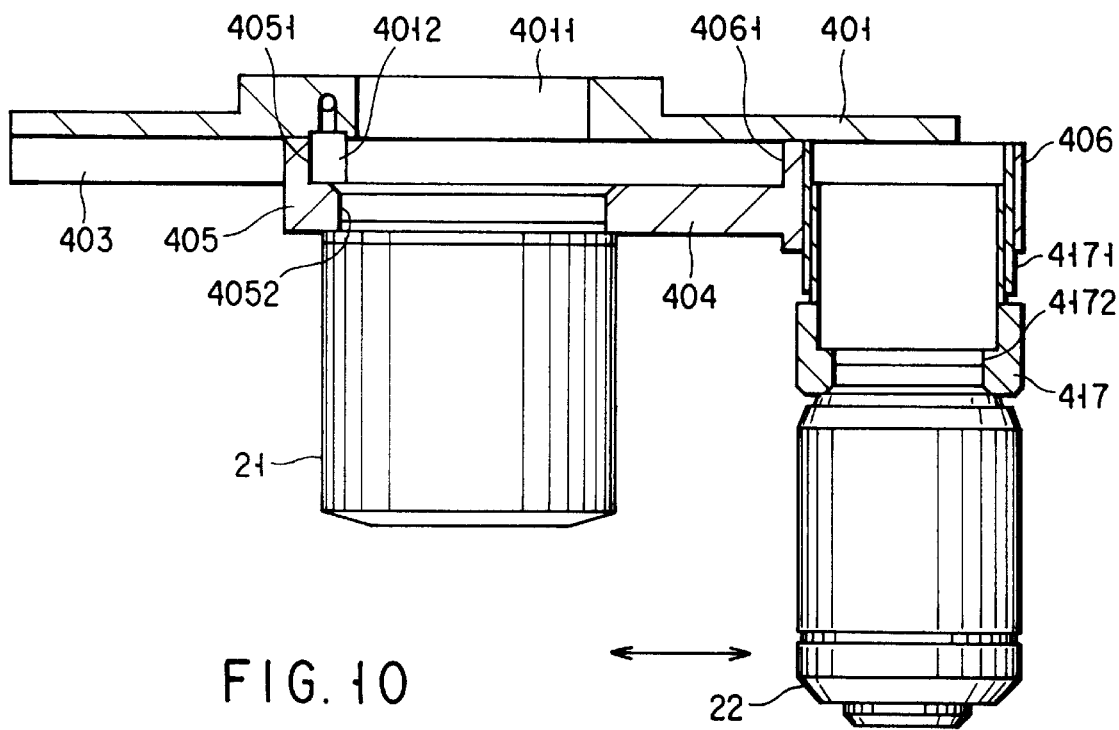
FIG. 10 is a view showing the schematic arrangement of the objective lens interchanging mechanism of the reflected light fluorescence microscope applied to the third embodiment.

FIGS. 9 and 10 show the schematic arrangement of an objective lens interchanging mechanism 4 applied to the third embodiment of the present invention. Portions that are identical to those of FIGS. 3 and 4 are denoted by the same reference numerals as in FIGS. 3 and 4.

In this case, a lens mount portion 406 of a movable portion 404 which serves to mount an objective lens 22 has a parfocal adjusting member 417. The parfocal adjusting member 417 is mounted to a lens mount portion 406 through a screw portion 4171, and its height with respect to the lens mount portion 406 can be adjusted by the screwing amount of the screw portion 4171. The parfocal adjusting member 417 has a mount screw portion 4172 for the objective lens 22.

Except for these respects, the arrangements of FIGS. 9 and 10 are identical to those of FIGS. 3 and 4. Accordingly, the same effect as that of the first embodiment described above can be expected. Since the mounting surface position of the objective lens 22 can be adjusted in accordance with the parfocal distance of the objective lens 22 to be used, one objective lens interchanging mechanism 4 can cope with the objective lenses 22 having different parfocal distances as far as they have the same mount screw diameter. The mounting surface position of the objective lens 22 can be adjusted and corrected for variations in parfocal distances of the respective objective lenses 22 and variations in distance from the surface of the specimen 2 to the water surface, as in a case where the specimen 2 is located in an aqueous solution. Therefore, re-focusing is not required when the objective lens is to be replaced, and the objective lens interchanging operation can be performed easily.

In the third embodiment, the parfocal adjusting member 417 performs height adjustment with the screw portion 4171 in accordance with the parfocal distance. Alternatively, such a screw portion need not be used. In this case, members (adapters) matching the parfocal distances of the respective objective lenses may be prepared, and corresponding one may be mounted and used in accordance with the objective lens to be employed.

[Fourth Embodiment]

Figure 11A:
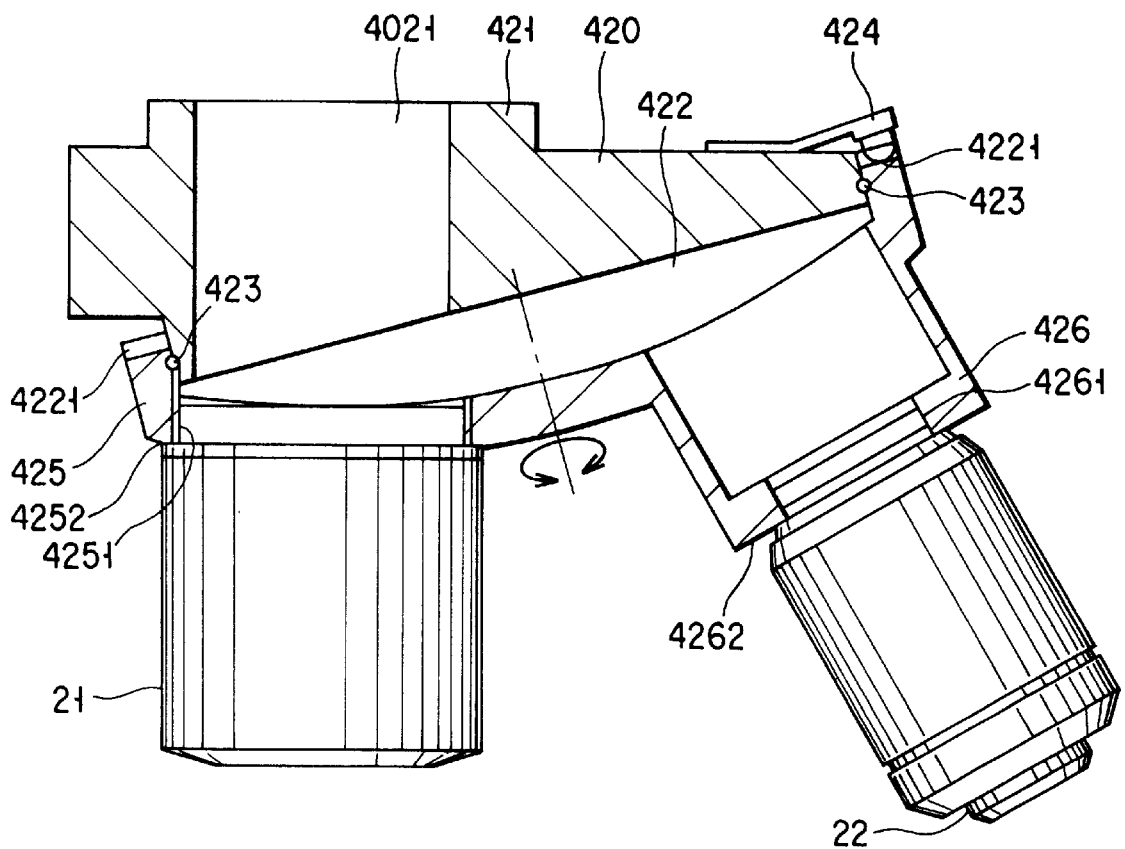
FIGS. 11A and 11B are views showing the schematic arrangement of the objective lens interchanging mechanism of a reflected light fluorescence microscope applied to the fourth embodiment of the present invention.
Figure 11B:
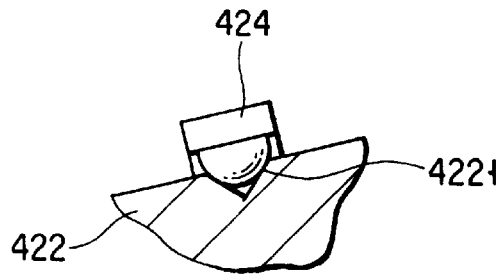

FIGS. 11A and 11B show the schematic arrangement of an objective lens interchanging mechanism 4 applied to the fourth embodiment of the present invention.

Referring to FIGS. 11A and 11B, reference numeral 420 denotes the stationary portion of the objective lens interchanging mechanism 4. A dovetail 421 is formed on the upper surface of the stationary portion 420. The objective lens interchanging mechanism 4 can be detachably mounted on a focusing unit 103 identical to that described with reference to FIG. 1 through the dovetail 421.

The stationary portion 420 is provided with a rotatable portion 422 to be pivotal through a bearing 423 in the directions of a double-headed arrow in FIG. 11A. The rotatable portion 422 has lens mount portions 425 and 426 for at least two objective lenses 21 and 22. When the rotatable portion 422 is pivoted, the lens mount portions 425 and 426 can be selectively set to coincide with the observation optical axis of the stationary portion 420. In this case, the stationary portion 420 has a click 424 to which a spring force is applied. When one of the lens mount portions 425 and 426 is located on the observation optical axis, the click 424 of the stationary portion 420 is fitted in a V-groove 4221 of the rotatable portion 422, as shown in FIG. 11B. In FIG. 11A, the lens mount portion 425 is located on the observation optical axis and the click 424 of the stationary portion 420 is fitted in the V-groove 4221.

The objective lenses 21 and 22 having different screw diameters and different parfocal distances can be mounted to the lens mount portions 425 and 426, respectively, of the rotatable portion 422. Of the lens mount portions 425 and 426, the lens mount portion 425 has a mount screw portion 4251 with such a mount screw diameter that the objective lens 21, the mount screw diameter of which is increased to set a large NA and the parfocal distance of which is increased in order to increase the working distance, can be mounted to it as the low-magnification large-diameter objective lens having a large exit pupil. The lens mount portion 426 has a mount screw portion 4261 with a mount screw diameter that complies with the international standards, so that the ordinary objective lens 22 can be mounted to it. Furthermore, the lens mount portions 425 and 426 respectively have objective lens mounting surfaces 4252 and 4262 having a step difference corresponding to the parfocal difference between the objective lenses 21 and 22. Even when a switching operation is performed between the objective lenses 21 and 22 having different parfocal distances, the parfocal state is maintained.

Therefore, the same effect as that of the first embodiment described above can be expected. Since a switching operation between the objective lenses 21 and 22 can be performed by only rotating the rotatable portion 422, the arrangement of the objective lens interchanging mechanism 4 can be further simplified, and a stable switching operation can be obtained.

The mount screw portion 4251 of the lens mount portion 425 formed on the rotatable portion 422 is set to match the large-diameter objective lens 21. When an ordinary objective lens is to be used, an adapter may be mounted by using the mount screw portion 4251.

As described above through the first to fourth embodiments, according to the first aspect of the present invention, when the effective diameter of the observation optical axis is increased, the brightness of the observation image of the fluorescent specimen can be increased, and fluorescence observation at a lower magnification is allowed. The effective diameter of the illumination optical system is not increased but is left at the same value as in the conventional case. Since the intensity of the excitation light is not changed accordingly, damage, or degradation in discoloration, of the specimen can be prevented. The conventional illumination optical system (e.g., the light projection tube and excitation filter) can be used unchanged, which is advantageous in the manufacture. Only the size of the observation optical system need be increased, contributing to downsizing of the microscope.

The objective lens or a so-called ordinary lens having a pupil corresponding to the effective diameter of the illumination optical system, and an objective lens or a so-called large-diameter objective lens having a pupil corresponding to the effective diameter (which is set larger than the effective diameter of the illumination optical system) of the observation optical system, may be mounted to the same objective lens interchanging means, and can be selectively used.

Even when the large-diameter objective lens has a parfocal distance different from that of the ordinary objective lens for optimal design, the objective lenses can be mounted to the same objective lens interchanging means and a switching operation can be performed between them while their parfocal states are maintained, thus eliminating focusing upon the switching operation.

[Fifth Embodiment]

Figure 12:
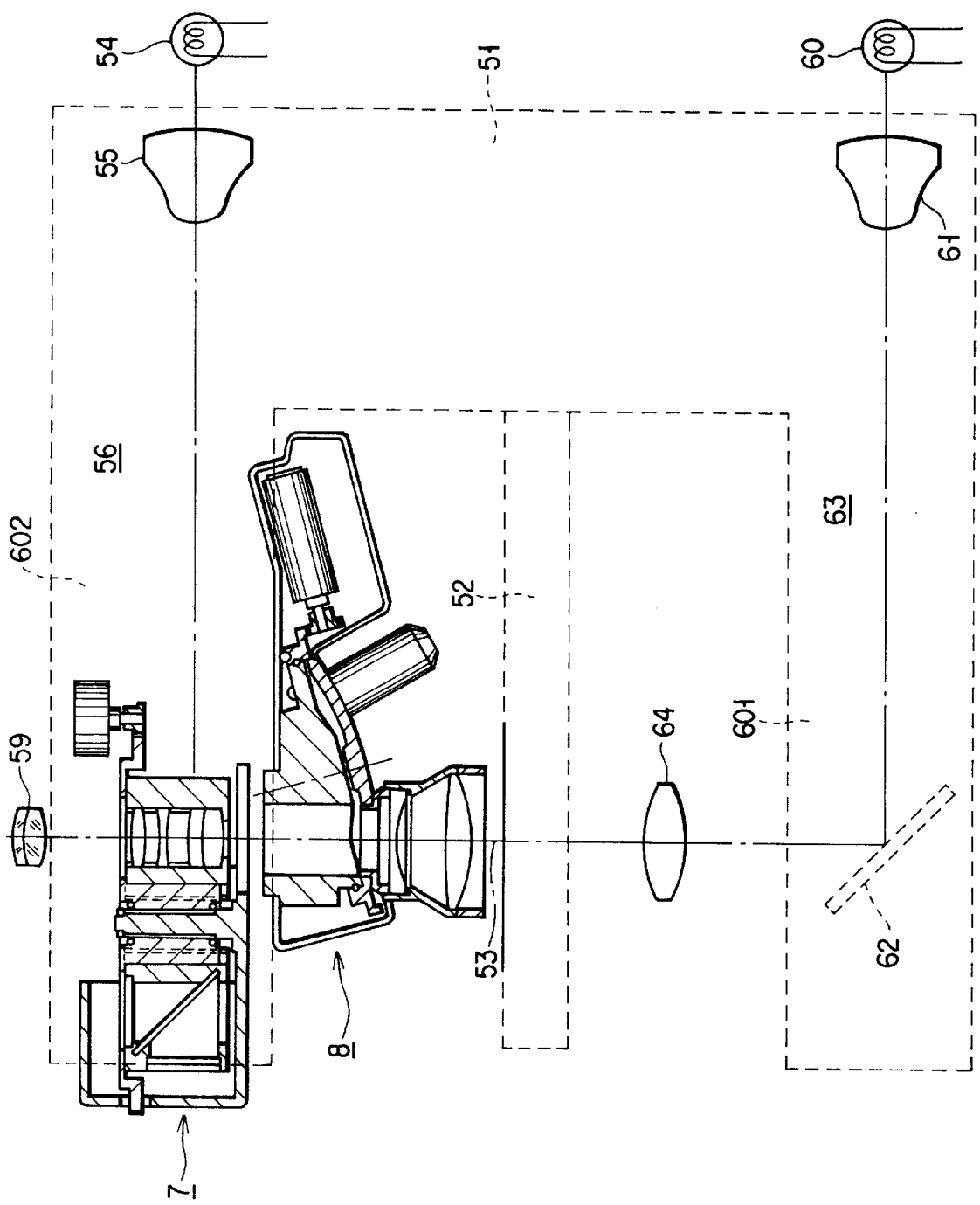
FIG. 12 is a view showing the entire portion of an optical microscope applied to the fifth embodiment of the present invention.

FIG. 12 is an overall view of a microscope to which the present invention is applied. Referring to FIG. 12, reference numeral 51 denotes a microscope main body. The microscope main body 51 has a base 601 and an arm 602 projecting parallel to the base 601. In the microscope main body 51, a stage 52 is arranged parallel to the base 601 and arm 602. A sample (not shown) is placed on the stage 52. The stage 52 is movable in an X-Y direction within a plane perpendicular to an observation optical axis 53.

A reflected light optical system 56 having a reflected light source 54 and a collector lens 55 is arranged on the arm 602 side of the microscope main body 51. Reflected light generated by the reflected light optical system 56 passes through a cube unit 7 and an objective lens unit 8 to irradiate the sample on the stage 52 along the observation optical axis 53. An obtained fluorescent image can be observed with an image sensing means (not shown), e.g., an eyepiece or a TV camera, through the objective lens unit 8, the cube unit 7, and a tube lens 59. A transmitted light optical system 63 having a transmitted light source 60, a collector lens 61, and a mirror 62 is arranged on the base 601 side. Reflected light generated by the transmitted light optical system 63 passes through a condenser lens 64 and is transmitted through the sample on the stage 52 along the observation optical axis 53. An obtained transmitted bright field observation image can be observed with an image sensing means (not shown), e.g., an eyepiece or a TV camera, through the objective lens unit 8, the cube unit 7, and the tube lens 59.

Figure 13:
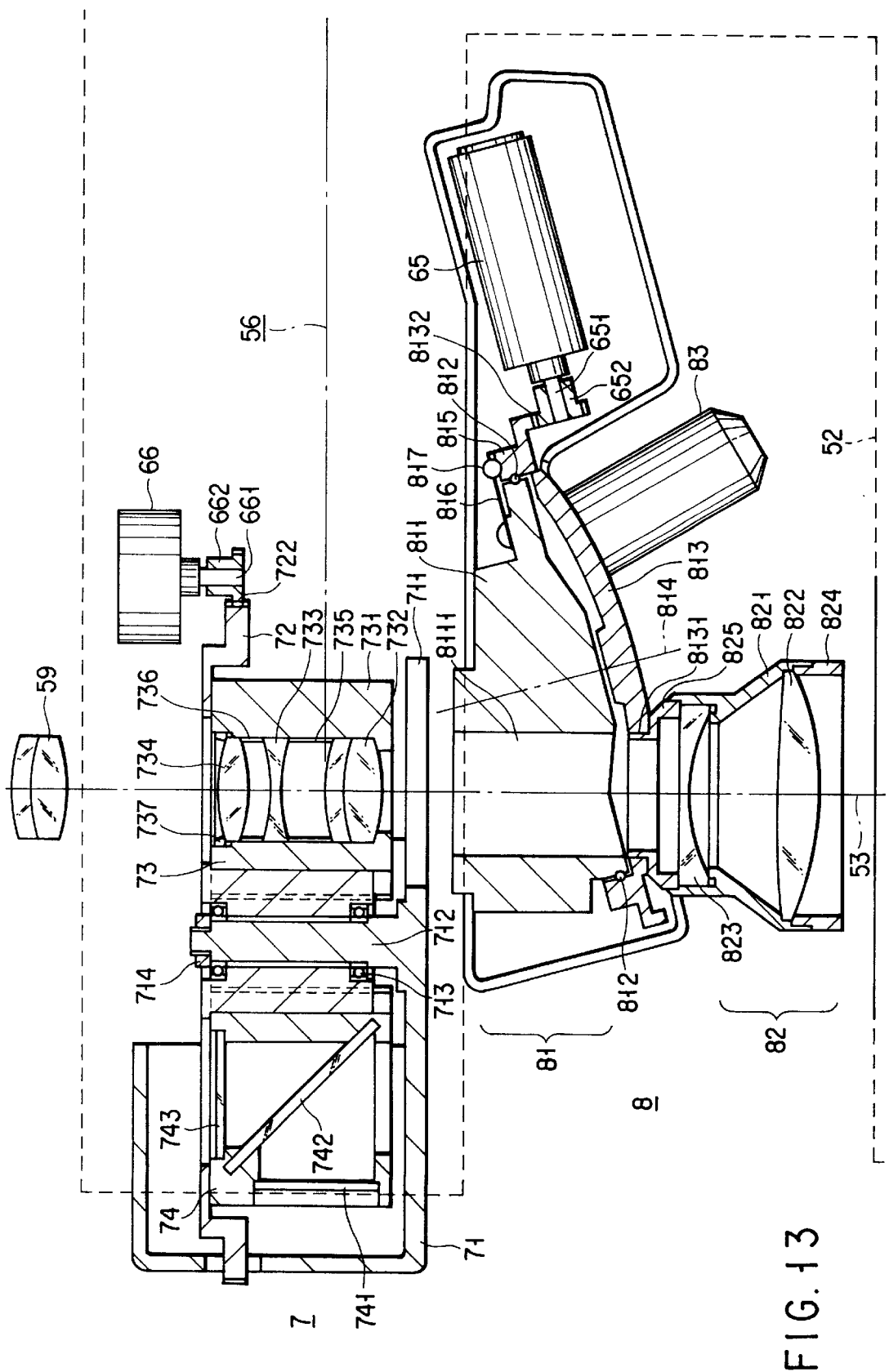
FIG. 13 is a view showing the schematic arrangement of the fifth embodiment.
Figure 14:
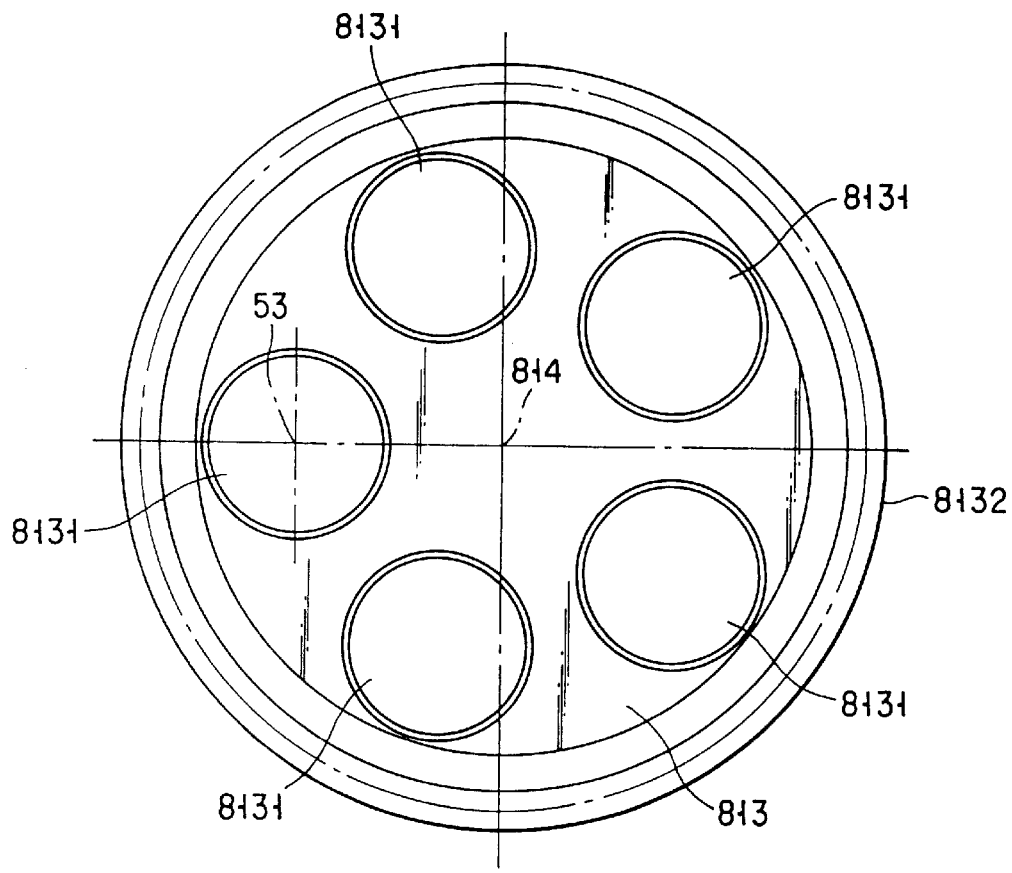
FIG. 14 is a view showing the schematic arrangement of a revolver used in the fifth embodiment.

As shown in FIG. 13, the objective lens unit 8 is constituted by a revolver 81, one very-low-magnification objective lens, e.g., a 0.5× objective lens 82, and a plurality of objective lenses 83 (only one is shown in FIG. 13). The revolver 81 serves as an objective lens interchanging means. The 0.5× objective lens 82 serves as the first objective lens held by the revolver 81. The objective lenses 83 have an ordinary magnification. In the revolver 81, a rotatable portion 813 is held, through a ball 812, by a stationary portion 811 fixed to the arm 602 of the microscope main body 51, such that it is rotatable about a rotation axis 814, which is inclined by a predetermined angle, as the center. In this case, a through hole 8111 is formed in the stationary portion 811 along the observation optical axis 53, and a plurality of screw holes 8131 are formed in the rotatable portion 813 at the respective mount positions of the objective lenses 82 and 83 (see FIG. 14). Each screw hole 8131 can communicate with the through hole 8111 of the stationary portion 811 on the observation optical axis 53. The rotatable portion 813 has a gear portion 8132 on its outer circumferential edge. A gear 652 of a rotating shaft 651 of a motor 65 meshes with the gear portion 8132. The rotatable portion 813 is rotated by the motor 65 about the rotation axis 814 as the center. In the rotatable portion 813, click grooves 815 are equidistantly formed along the outer circumferential edge portion. The rotatable portion 813 is also positioned when a ball 817 at the distal end of a positioning click spring 816 arranged in the stationary portion 811 is fitted in one of the click grooves 815.

In the 0.5× objective lens 82, lenses 822 and 823 are fitted in its main frame 821 and are fixed by screwing stop frames 824 and 825. Such a 0.5× objective lens 82 is detachably mounted in the corresponding screw hole 8131 of the rotatable portion 813 of the revolver 81 with its main frame 821. The objective lenses 83 have an ordinary magnification. These objective lenses 83 are also detachably mounted in the corresponding screw holes (not shown) of the rotatable portion 813 of the revolver 81.

Figure 15A:
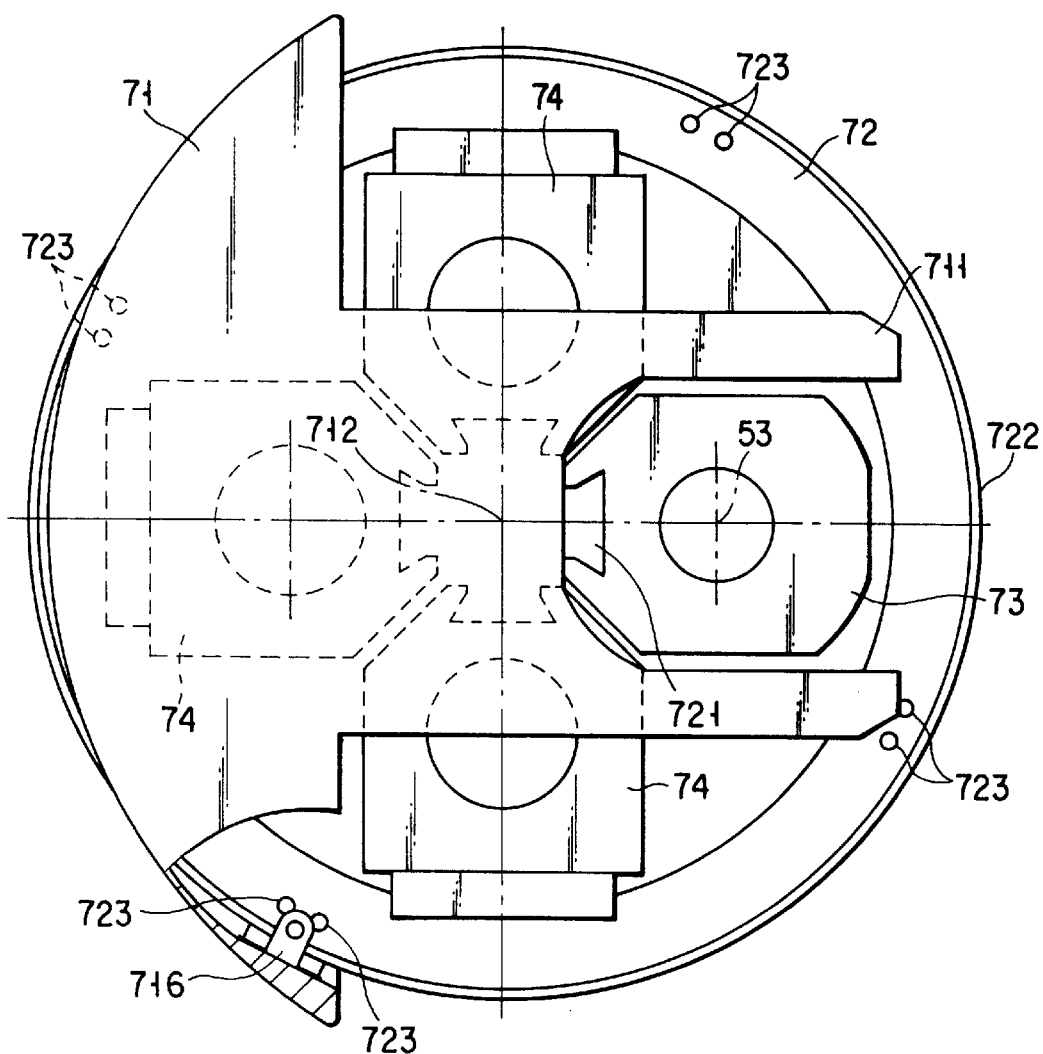
FIGS. 15A and 15B are views showing the schematic arrangement of a turret used in the fifth embodiment.

As shown in FIG. 13, the cube unit 7 has a stationary frame 71 and a turret 72 serving as a cube switching means. The stationary frame 71 is formed with a male dovetail 711 as shown in FIG. 15A. The stationary frame 71 is detachably fixed to the arm 602 of the microscope main body 51 through the male dovetail 711. The stationary frame 71 has a stationary shaft 712 extending upright in the direction of the observation optical axis 53. The turret 72 is rotatably held by the stationary shaft 712 as it is fastened with a nut 714 through bearings 713. In the turret 72, as shown in FIG. 15A, a plurality of (four in FIG. 15A) male dovetails 721 are formed at the rotation center portion held by the male dovetails 721, to extend along the stationary shaft 712. For example, a 0.5× auxiliary lens cube 73, serving as one auxiliary objective lens cube, and a plurality of (three in FIG. 15A) fluorescent cubes 74 having mirror units are detachably fixed to the turret 72 through the male dovetails 721. When the turret 72 is rotated about the stationary shaft 712 as the center, one of the cubes 73 and 74 is selectively located on the observation optical axis 53. In FIG. 15A, the 0.5× auxiliary lens cube 73 is located on the observation optical axis 53.

Figure 15B:
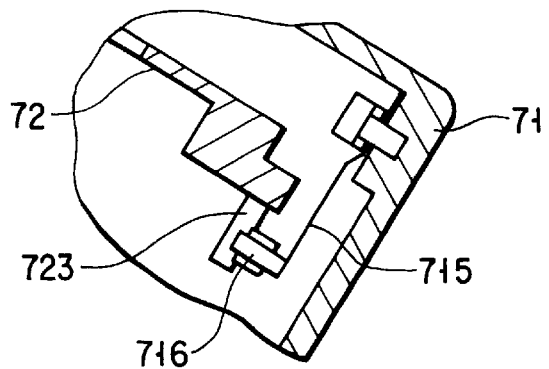

The turret 72 has a gear portion 722 on its outer circumferential edge. A gear 662 of a rotating shaft 661 of a motor 66 meshes with the gear portion 722. The turret 72 is rotated by the motor 66 about the stationary shaft 712 as the center. Pairs of click rods 723 equidistantly extend upright from the outer circumferential edge portion of the turret 72, as shown in FIGS. 15A and 15B. The turret 72 is positioned when a roller 716 at the distal end of a click spring 715 arranged on the stationary frame 71 side is fitted in one of the pairs of click rods 723.

In the 0.5× auxiliary lens cube 73, 0.5× auxiliary lenses 732, 733, and 734 serving as the second objective lenses are fitted in a cube main body 731 through spacers 735 and 736 by dropping, and are fixed with a retainer ring 737. Each fluorescent cube 74 integrally holds an excitation filter 741, a dichroic mirror 742, and an absorbing filter 743. The excitation filter 741 wavelength-selectively transmits therethrough reflected light from the reflected light optical system 56. The dichroic mirror 742 further wavelength-selectively reflects light transmitted through the excitation filter 741 toward the objective lens unit 8 side, and guides the reflected light coaxially with the observation optical axis 53. The absorbing filter 743 transmits therethrough the fluorescent image from the sample wavelength-selectively.

Figure 16:
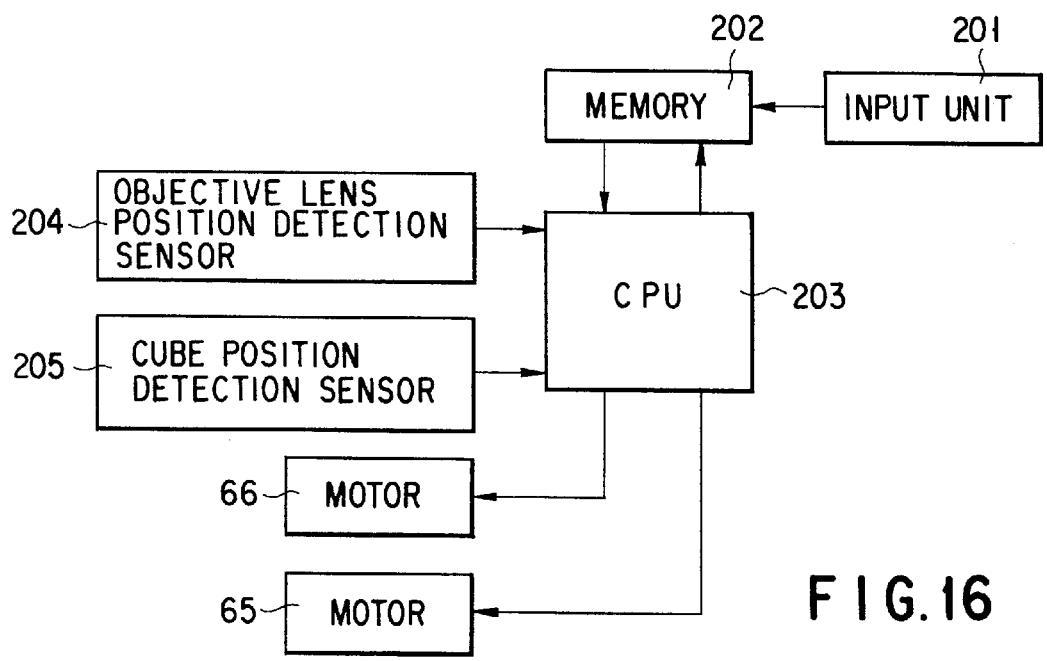
FIG. 16 is a view showing the schematic arrangement of a control system applied to the fifth embodiment.

The microscope main body 51 has a CPU 203 which controls to rotate the revolver 81 by the motor 65 and rotate the turret 72 by the motor 66 in an interlocked manner (see FIG. 16). As will be described later, the 0.5× auxiliary lens cube 73 or one fluorescent cube 74 of the turret 72 can be automatically inserted in the observation optical axis 53 to match the 0.5× objective lens 82 or the objective lens 83 which is inserted in the observation optical axis 53 in accordance with the selected microscopic method.

The operation of the embodiment having the above arrangement will be described.

When performing reflected light fluorescence observation, the motor 66 is driven by a selector switch (not shown) in advance to rotate the turret 72 of the cube unit 7, to insert a fluorescent cube 74 having a desired observation wavelength in the observation optical axis 53. Consecutively, the revolver 81 of the objective lens unit 8 is also rotated by the motor 65 to insert a desired objective lens 83 other than the 0.5× objective lens 82 in the observation optical axis 53.

In this state, reflected light from the reflected light source 54 of the reflected light optical system 56 is focused by the collector lens 55, is wavelength-selectively transmitted through the excitation filter 741 of the fluorescent cube 74 of the cube unit 7, is wavelength-selectively reflected by the dichroic mirror 742 and is guided to be coaxial with the observation optical axis 53, and irradiates the surface of the sample on the stage 52 through the objective lens 83 having a desired magnification. A fluorescent image generated by the sample passes through the objective lens 83, is wavelength-selectively transmitted through the dichroic mirror 742 and absorbing filter 743 in the fluorescent cube 74, and is observed with an image sensing means (not shown), e.g., an eyepiece or a TV camera, through the tube lens 59.

When performing transmitted light bright field observation, at least one of the three fluorescent cubes 74 of the cube unit 7 is removed from the turret 72 in advance.

First, when performing sample observation with an objective lens 83 other than the 0.5× objective lens 82, the revolver 81 is rotated by the motor 65 to insert a predetermined objective lens 83 in the observation optical axis 53. Consecutively, the turret 72 is rotated by the motor 66 to insert an empty hole from which the fluorescent cube 74 is removed in the observation optical axis 53.

In this state, the illumination light transmitted from the transmitted light source 60 of the transmitted light optical system 63 is focused by the collector lens 61, is reflected by the mirror 62 toward the sample on the stage 52, and is further focused by the condenser lens 64 to irradiate the sample. Observation light which has been transmitted through the sample is caused by the objective lens 83 to pass through the empty hole of the cube unit 7 from which the fluorescent cube 74 is removed, and is observed with an image sensing means (not shown), e.g., an eyepiece or a TV camera, through the tube lens 59.

When performing observation by using the 0.5× objective lens 82, the revolver 81 is rotated by the motor 65 to insert the 0.5× objective lens 82 in the observation optical axis 53. Then, in an interlocked manner with rotation of the revolver 81 by the motor 65, the turret 72 is rotated by the motor 66 to insert the 0.5× auxiliary lens cube 73 in the observation optical axis 53.

In this state, the illumination light transmitted from the transmitted light source 60 of the transmitted light optical system 63 is focused by the collector lens 61, is reflected by the mirror 62 toward the sample on the observation optical axis 53, and is further focused by the condenser lens 64 to irradiate the sample. Observation light which has been transmitted through the sample is caused by the 0.5× objective lens 82 to further pass through the 0.5× auxiliary lens cube 73 of the cube unit 7, and is observed with an image sensing means (not shown), e.g., an eyepiece or a TV camera, through the tube lens 59.

When observation is to be performed with an objective lens 83 other than the 0.5× objective lens 82 while the 0.5× auxiliary lens cube 73 is inserted in the observation optical axis 53, the revolver 81 is rotated by the motor 65 to insert the objective lens 83 in the observation optical axis 53. Then, in an interlocked manner with rotation of the revolver 81 by the motor 65, the turret 72 is rotated by the motor 66 to insert the empty hole from which the fluorescent cube 74 is removed in the observation optical axis 53.

Rotation of the revolver 81 by the motor 66 and rotation of the turret 72 by the motor 66, which is interlocked with it, are controlled by the CPU 203, on the basis of information on the types of and positional relationship among the cubes 73 and 74 and lenses 82 and 83, which are input to a memory 202 by an input unit 201 at the initial setting stage, while referring to information on the types of and positional relationship among the cubes 73 and 74 and lenses 82 and 83, which are detected by an objective lens position detection sensor 204 and a cube position detection sensor 205 during actual motion.

In FIG. 16, although the objective lens position detection sensor 204 and the cube position detection sensor 205 are shown as independent sensors, this conceptual view represent signals. In fact, the sensors 204 and 205 are arranged at positions where they can detect the movable portions of the revolver 81 and turret 72, respectively.

A case wherein a magnification change is performed from the 0.5× objective lens 82 to another objective lens 83 and simultaneously the microscopic method is switched from transmitted light bright field observation to reflected light fluorescence observation will be described. The 0.5× objective lens 82 and the 0.5× auxiliary lens cube 73 have already been inserted in the observation optical axis 53 at the time point of transmitted light bright field observation. The revolver 81 of the objective lens unit 8 is rotated by the motor 65 to insert an objective lens 83 having a desired magnification in the observation optical axis 53 to replace the 0.5× objective lens 82. In an interlocked manner with this, the turret 72 of the cube unit 7 is rotated by the motor 66 to insert a fluorescent cube 74 having a desired observation wavelength in the observation optical axis 53 to replace the 0.5× auxiliary lens cube 73. Observation with the objective lens 83 is then performed by following procedures identical to those employed when performing reflected light fluorescence observation described above.

In this case, a switching operation is performed from the 0.5× objective lens 82 to the objective lens 83 having a desired magnification. When a switching operation is performed between the objective lenses 83, the revolver 81 is rotated by the motor 65 to insert an objective lens 83 having another magnification in the observation optical axis 53 to replace the current objective lens 83. In an interlocked manner with this, the turret 72 of the cube unit 7 is rotated by the motor 66 to insert a fluorescent cube 74 having a desired observation wavelength in the observation optical axis 53 to replace the empty hole from which the current fluorescent cube 74 is removed.

Figure 17A:
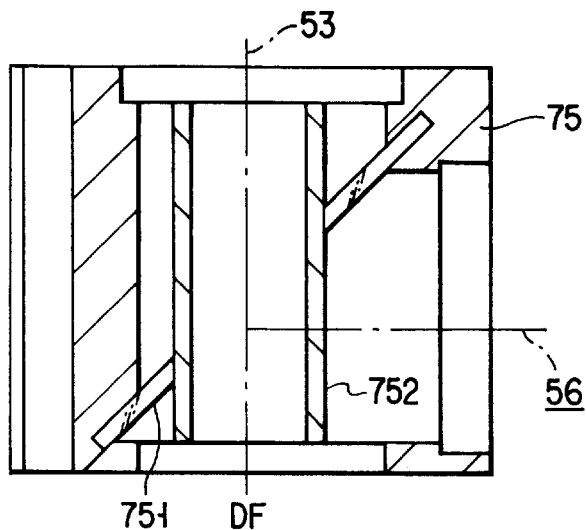
FIGS. 17A to 17C are views showing the schematic arrangements of various types of cubes applied to the fifth embodiment.
Figure 17B:
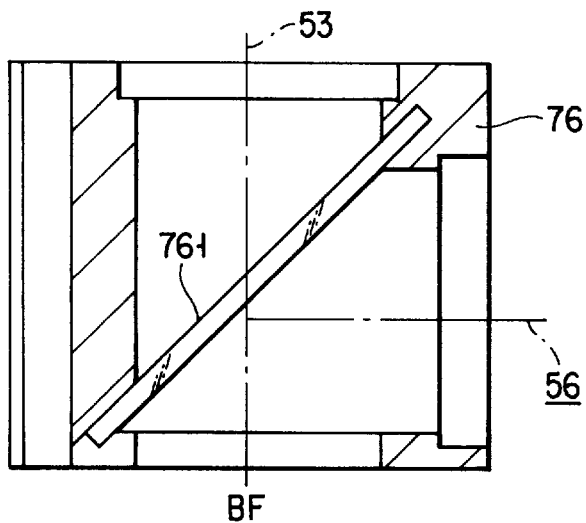
Figure 17C:
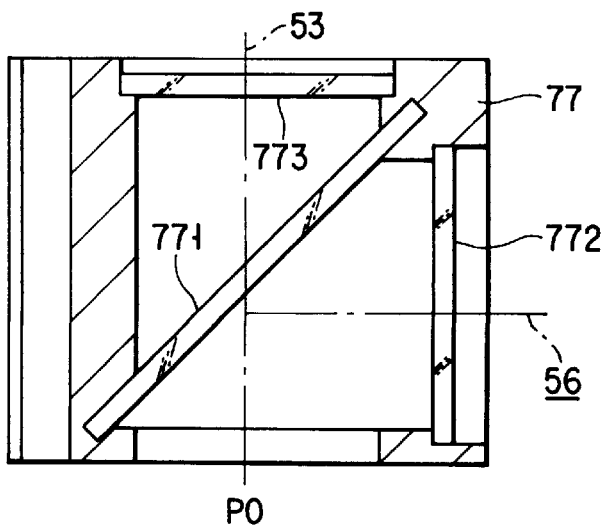

Even if the fluorescent cube 74 to be detachably mounted in the turret 72 of the cube unit 7 is replaced for one of a reflected light dark field cube (DF) 75, a reflected light bright field cube (BF) 76, and a reflected light/polarized light observation cube (PD) 77 shown in FIGS. 17A to 17C in accordance with the microscopic method, the same effect as that described above can be expected. The reflected light dark field cube 75 has an annular mirror 751 and a dark field barrel portion 752. In the reflected light dark field cube 75, illumination light from the reflected light source 54 is reflected by the annular mirror 751 toward the objective lens in the form of an annular illumination light beam. Observation light from the sample is passed through the dark field barrel portion 752 so that it is separated from the annular illumination light beam. The reflected light bright field cube 76 has a half mirror 761. In the reflected light bright field cube 76, illumination light from the reflected light source 54 is reflected by the half mirror 761 toward the objective lens, and observation light from the sample is transmitted through the half mirror 761. The reflected light/polarized light observation cube 77 has a beam splitter 771, a polarizer 772, and an analyzer 773. In the reflected light/polarized light observation cube 77, illumination light from the reflected light source 54 is linearly polarized by the polarizer 772 and reflected by the beam splitter 771 toward the objective lens. Observation light from the sample is transmitted through the beam splitter 771 and is linearly polarized by the analyzer 773. The polarizer 772 and the analyzer 773 are arranged in the so-called crossed nicols state wherein their vibrating directions are 90° from each other, thus allowing reflected light/polarized light observation.

According to the fifth embodiment, a very-low-magnification objective lens is constituted by the 0.5× objective lens 82 and the 0.5× auxiliary lens cube 73. The 0.5× objective lens 82 is mounted to the revolver 81, together with another objective lens 83, such that they can be selectively inserted in and removed from the observation optical axis 53. The 0.5× auxiliary lens cube 73 is mounted in the turret 72, together with another fluorescent cube 74, such that they can be selectively inserted in and removed from the observation optical axis 53. When the 0.5× objective lens 82 is inserted in the observation optical axis 53 by the revolver 81, the 0.5× auxiliary lens cube 73 is inserted in the observation optical axis 53 by the turret 72 in an interlocked manner with this, thus allowing observation with the very-low-magnification objective lens. Since the 0.5× auxiliary lens cube 73 is mounted in the turret 72 together with another fluorescent cube 74, an exclusive mount space need not be formed, and the entire microscope can be made compact because of space saving. The height of eye point need not be increased, so that the operator can perform observation with a natural posture. Since the 0.5× auxiliary lens cube 73 can be inserted in and removed from the observation optical axis 53 by utilizing the turret 72 which performs a switching operation among various types of microscopic methods, a switching operation between observation with the 0.5× objective lens 82 and observation with another objective lens can be performed easily.

Since the switching operation of the revolver 81 can be interlocked with the switching operation of the turret 72, when the revolver 81 performs a switching operation, not only the observation magnification is changed but also the fluorescent cube 74 and the 0.5× auxiliary lens cube 73 are switched to switch the microscopic method simultaneously. As a result, a cumbersome operation can be eliminated to improve the operability. This arrangement is particularly effective when bright field observation is performed with a very-low-magnification (0.5× in this case) to decrease discoloration of the sample and fluorescence observation is performed only at a high magnification.

Since the 0.5× auxiliary lens cube 73 can be detachably mounted in the turret 72, the 0.5× auxiliary lens cube 73 can be easily replaced for a cube having another desired magnification, e.g., 0.4× to 1.0×.

[Sixth Embodiment]

Figure 18:
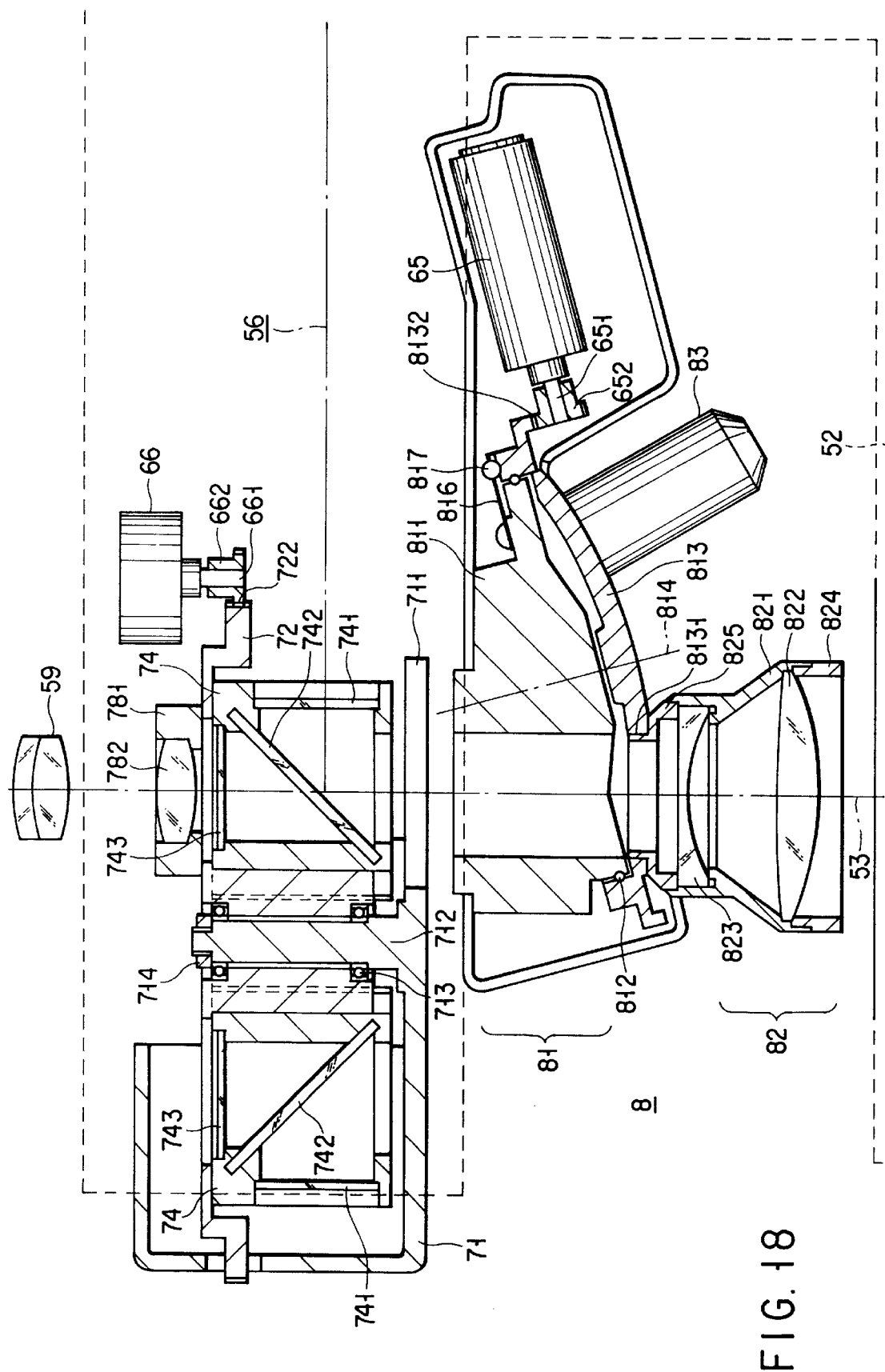
FIG. 18 is a view showing the schematic arrangement of the sixth embodiment of the present invention.

FIG. 18 shows the schematic arrangement of the sixth embodiment of the present invention. Portions that are identical to those of FIG. 13 are denoted by the same reference numerals as in FIG. 13.

In this case, a turret 72 of a cube unit 7 detachably fixes four fluorescent cubes 74. A lens mounting frame 781 is fixed to the turret 72 immediately above (image side) at least one of the fluorescent cubes 74. A 0.5× auxiliary lens 782 is detachably arranged in the lens mounting frame 781 as the second objective lens. Namely, a maximum of four 0.5× auxiliary lenses 782 can be mounted to the four fluorescent cubes 74.

When such a turret 72 is rotated about a stationary shaft 712 as the center, the fluorescent cubes 74 each having the 0.5× auxiliary lens 782 can be selectively located on an observation optical axis 53. In FIG. 18, the 0.5× auxiliary lens 782 is located on the observation optical axis 53.

In this arrangement, when performing reflected light fluorescence observation, at least two fluorescent cubes 74 having the same observation wavelength are mounted in the turret 72 in advance. The 0.5× auxiliary lens 782 is mounted immediately above one of the two fluorescent cubes 74.

In this state, to perform 0.5× observation, the turret 72 is rotated by a motor 66 to insert a fluorescent cube 74 having the 0.5× auxiliary lens 782 in the observation optical axis 53. Consecutively, a revolver 81 of a objective lens unit 8 is also rotated by a motor 65 to insert a 0.5× objective lens 82 in the observation optical axis 53. Then, 0.5× reflected light fluorescence observation is allowed. To perform observation at a magnification other than 0.5×, the turret 72 is rotated by the motor 66 to insert a fluorescent cube 74 not having a 0.5× auxiliary lens 782 in the observation optical axis 53. Consecutively, the revolver 81 of the objective lens unit 8 is also rotated by the motor 65 to insert an objective lens 83 other than the 0.5× objective lens 82 in the observation optical axis 53. Then, reflected light fluorescence observation with the current objective lens 83 is allowed.

To perform transmitted light bright field observation, at least two fluorescent cubes 74 are removed from the turret 72 to make the holes empty. The 0.5× auxiliary lens 782 is mounted in one of the empty holes from which the fluorescent cubes 74 are removed.

In this state, to perform 0.5× observation, the turret 72 is rotated by the motor 66 to insert a empty hole having a 0.5× auxiliary lens 782 in the observation optical axis 53. Consecutively, the revolver 81 of the objective lens unit 8 is also rotated by the motor 65 to insert the 0.5× objective lens 82 in the observation optical axis 53. Then, 0.5× transmitted light bright field observation is allowed. To perform observation at a magnification other than 0.5×, the turret 72 is rotated by the motor 66 to insert a empty hole, from which the fluorescent cube 74 is removed, in the observation optical axis 53. Consecutively, the revolver 81 of the objective lens unit 8 is also rotated by the motor 65 to insert an objective lens 83 other than the 0.5× objective lens 82 in the observation optical axis 53. Then, transmitted light bright field observation with the current objective lens 83 is allowed.

In this manner, the 0.5× auxiliary lens 782 is mounted not in the mount space for the fluorescent cube 74 of the turret 72 but in the turret 72 in this space. Accordingly, the fluorescent cube 74 and the 0.5× auxiliary lens 782 can be inserted in the observation optical axis 53 simultaneously, and accordingly very-low-magnification observation using the 0.5× auxiliary lens 782 can be performed not only in transmitted light bright field observation but also in fluorescence observation or various types of other microscopic observations.

Since the 0.5× auxiliary lens 782 is arranged on an upper side (image side) of the reflected light optical system 56, when the reflected light irradiates the specimen, the light need not be transmitted through the 0.5× auxiliary lens 782. As a result, a high transmittance can be obtained and bright illumination can be performed. In the case of fluorescence observation, since the reflected light (excitation light) does not irradiate a member other than the 0.5× auxiliary lens 782, observation is not affected by the self fluorescence caused by the 0.5× auxiliary lens 782, and high-contrast observation can be performed.

In the above description, reflected light fluorescence observation and transmitted light bright field observation are performed by changing the observation magnification. If these two observation schemes are combined, a magnification switching operation, e.g., from 0.5× transmitted light bright field observation to reflected light fluorescence observation with the objective lens 83, and the microscopic method switching operation can be performed simultaneously. The observation scheme can be combined with a cube employing a microscopic method other than that of the fluorescent cube 74, as described with reference to FIGS. 17A to 17C. Furthermore, the turret 72 and the revolver 81 may be interlocked with each other to perform a switching operation among various types of cube combinations.

[Seventh Embodiment]

Figure 19:
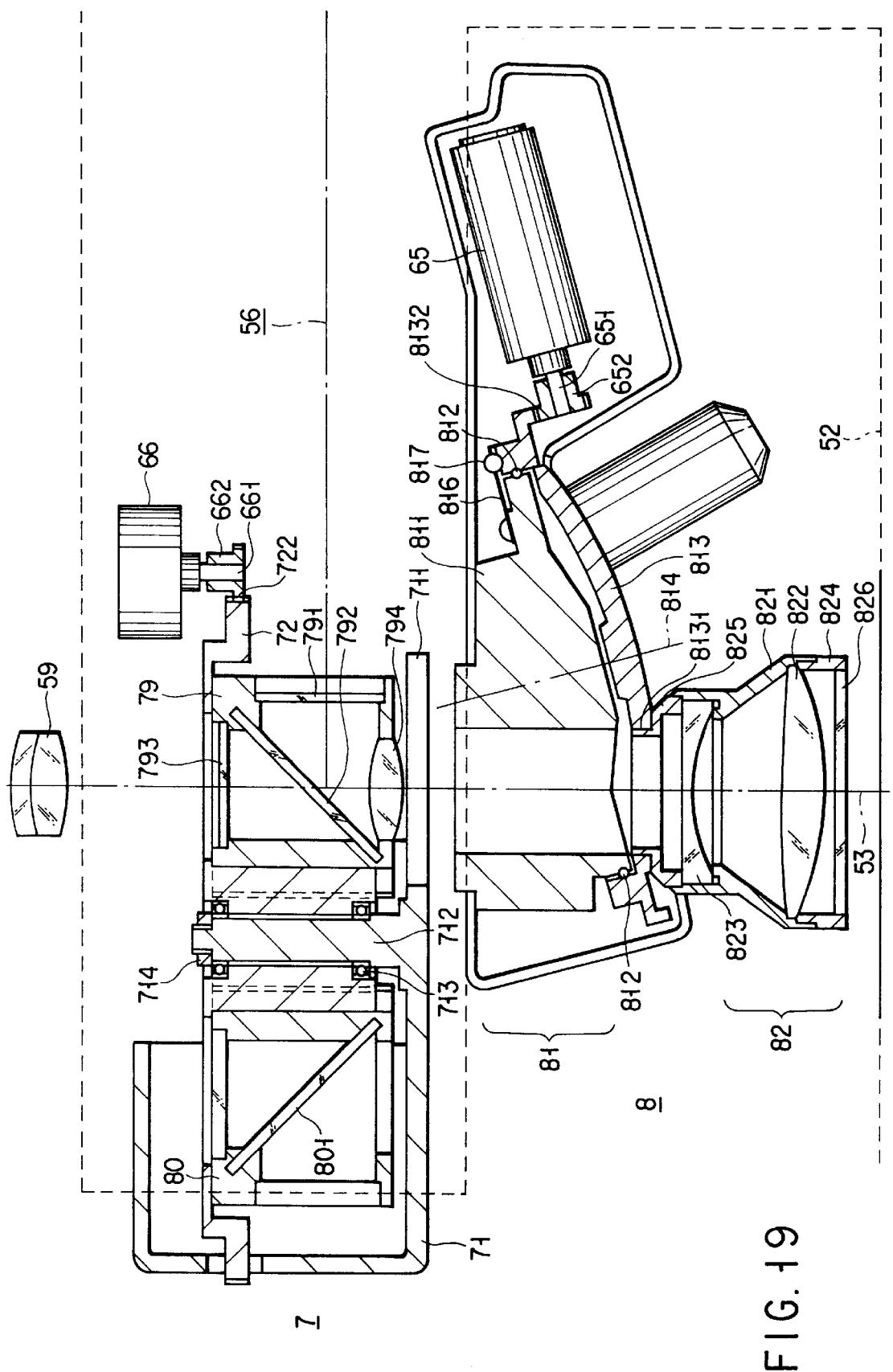
FIG. 19 is a view showing the schematic arrangement of the seventh embodiment of the present invention.

FIG. 19 shows the schematic arrangement of the seventh embodiment of the present invention. Portions that are identical to those of FIG. 13 are denoted by the same reference numerals as in FIG. 13.

In this case, a 0.5× auxiliary lens cube 79 has a polarizer 791, a polarizing beam splitter 792, an analyzer 793, and a 0.5× auxiliary lens 794. The polarizer 791 polarizes illumination light from a reflected light source 54 into linearly polarized light whose vibrating direction is perpendicular to the surface of the sheet of drawing. The polarizing beam splitter 792 selectively reflects the linearly polarized light having a vibrating direction that has been transmitted through the polarizer 791 toward an objective lens unit 8, guides reflected light to be coaxial with an observation optical axis 53, and selectively transmits therethrough, of observation light from the sample, linearly polarized light which is 90° with respect to the vibrating direction of the linearly polarized light which has been transmitted through the polarizer 791. The analyzer 793 polarizes observation light, which has been transmitted through the polarizing beam splitter 792, into linearly polarized light in a direction of crossed nicols with the polarizer 791, such that its vibrating direction is orthogonal with the observation optical axis 53. The 0.5× auxiliary lens 794 serves as the second objective lens. The 0.5× auxiliary lens cube 79 can be detachably mounted in a turret 72.

A reflected light bright field cube 80 has a half mirror 801 and can be detachably mounted in the turret 72 together with the 0.5× auxiliary lens cube 79.

A 0.5× objective lens 82 detachably mounted on a revolver 81 of the objective lens unit 8 fixes a λ/4 plate 826 at its distal end closest to the sample side. The λ/4 plate 826 is set such that the direction of its optical axis is 450 with respect to the vibrating directions of the polarizer 791 and analyzer 793.

In this arrangement, when reflected light bright field observation is to be performed, the 0.5× auxiliary lens cube 79 is mounted in the turret 72 together with the reflected light bright field cube 80. When 0.5× observation is to be performed, the turret 72 is rotated by a motor 66 to insert the 0.5× auxiliary lens cube 79 in the observation optical axis 53. Consecutively, the revolver 81 of the objective lens unit 8 is also rotated by a motor 65 to insert the 0.5× objective lens 82 in the observation optical axis 53.

In this state, illumination light from the reflected light source 54 is polarized by the polarizer 791 into linearly polarized light, is reflected by the polarizing beam splitter 792 toward the objective lens unit 8, is transmitted through the 0.5× auxiliary lens 794 and 0.5× objective lens 82, and is further transmitted through the λ/4 plate 826 so as to be polarized into circularly polarized light, to irradiate the sample. Observation light reflected by the sample is transmitted through the λ/4 plate 826 so as to be converted into linearly polarized light in a direction 90° with respect to the vibrating direction of the linearly polarized light of the illumination light upon being transmitted through the polarizer 791, is transmitted through the 0.5× objective lens 82 and 0.5× auxiliary lens 794, is further transmitted so as to coincide with both the direction of polarized light transmitted through the polarizing beam splitter 792 and the vibrating direction of the analyzer 793, and is observed with an image sensing means (not shown), e.g., an eyepiece or a TV camera, through the tube lens 59.

The illumination light which is transmitted through the polarizer 791 to be polarized into linearly polarized light and is reflected by the respective lens surfaces of the 0.5× objective lens 82 and 0.5× auxiliary lens 794 is not transmitted through the λ/4 plate 826. The polarizing direction of this illumination light is 90° with respect to the transmitting and polarizing direction of the polarizing beam splitter 792 and the vibrating direction of the analyzer 793. This illumination light is cut by the polarizing beam splitter 792 and analyzer 793 and does not reach the tube lens 59. As a result, flare or ghost is prevented.

When observation is to be performed by using an objective lens 83 other than the 0.5× objective lens 82, the motor 66 is driven to rotate the turret 72 of a cube unit 7 so as to insert the reflected light bright field cube 80 in the observation optical axis 53. Consecutively, the revolver 81 of the objective lens unit 8 is also rotated by the motor 65 to insert the objective lens 83 other than the 0.5× objective lens 82 in the observation optical axis 53.

In this state, illumination light emitted from the reflected light source 54 is reflected by the half mirror 801 of the reflected light bright field cube 80 toward an objective lens unit 8, and is transmitted through the objective lenses 83 to irradiate the sample surface. Observation light reflected by the sample is transmitted through the objective lens 83 again and through the half mirror 801 to be observed with an image sensing means (not shown), e.g., an eyepiece or a TV camera, through the tube lens 59.

In this manner, in reflected light bright field observation with the 0.5× objective lens 82 which tends to be affected by ghost or flare, the 0.5× auxiliary lens cube 79 integrally having the polarizer 791, the polarizing beam splitter 792, the analyzer 793, and the 0.5× auxiliary lens 794 is selected. When observation is to be performed with the high-magnification objective lens 83, other than the 0.5× objective lens 82, which is not easily affected by ghost or flare, only the 0.5× auxiliary lens cube 79 need be switched to another fluorescent cube 74. Therefore, a cumbersome operation accompanying switching of the objective lens can be eliminated, thus improving the operability. In place of the polarizing beam splitter 792 in the 0.5× auxiliary lens cube 79, a half mirror that can branch light may be used.

Since the 0.5× auxiliary lens 782 is arranged under (on the 0.5× objective lens side of) the reflected light optical system 56, when reflected light bright field observation is to be performed, the field stop (F.S.) forms a sharp image in the same manner as in observation employing an objective lens having another magnification.

The F.S. is arranged in the reflected light optical system (not shown). The F.S. is projected onto the objective lens image surface for the first time with the tube lens 59 and an F.S. projection lens in the reflected light optical system which serves to project the F.S. (not shown). The F.S. is projected onto the sample surface for the first time with the F.S. projection lens and an objective lens which projects an objective lens image onto a regular position with only the tube lens 59. For example, if the 0.5× auxiliary lens is arranged between the F.S. projection lens and the tube lens 59, as in FIG. 18 showing the sixth embodiment, the F.S. is not projected onto the regular objective lens image surface.

Although the turret 72 of the cube unit 7 and the revolver 81 of the objective lens unit 8 are interlocked with each other in the fifth to seventh embodiments described above, they need not always be interlocked with each other, but may be switched manually and not electrically. Although the cube unit 7 is switched by the turret 72, the present invention is not limited to this, and the cube unit 7 may be linearly switched with a slider. In the above description, the objective lens is constituted by two parts, i.e., the 0.5× objective lens 82 and the 0.5× auxiliary lens 794. However, the present invention is not limited to this. For example, another cube unit may be arranged between the cube unit 7 and the tube lens 59, so that objective lens is divided into three parts that can be switched in an interlocked manner with each other.

As has been described above through the fifth to seventh embodiments, according to the second aspect of the present invention, the second objective lens can be selectively inserted in and removed from the observation optical axis, together with the plurality of cubes corresponding to different microscopic methods, with a cube selecting means. An exclusive space for the second objective lens need not be formed, and the entire microscope can be made compact because of space economization. The height of eye point need not be increased, so that the operator can perform observation with a natural posture.

The switching operation of the cube switching means can be interlocked with the objective lens switching means. When the objective lens switching means is switched, not only the observation magnification is changed but also the cubes are switched to switch the microscopic method, providing a good operability.

Since the second objective lens can be detachably mounted in the cube switching means, the second objective lens can be replaced for one having a desired magnification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical microscope comprising:

a light source for emitting illumination light;

a reflected illumination optical system for irradiating a specimen with the illumination light emitted from said light source, said reflected illumination optical system including at least an excitation filter and a dichroic mirror;

objective lens switching means for selectively inserting a plurality of objective lenses including a large-diameter objective lens and an ordinary objective lens on an optical axis of observation light from the specimen and positioning said plurality of objective lenses;

an observation optical system for observing the specimen through one of said plurality of objective lenses, said observation optical system including an absorbing filter and the dichroic mirror; and a mirror unit having said excitation filter, dichroic mirror and absorbing filter, said mirror unit being detachably inserted, using a turret, into said observation optical system and said reflected illumination optical system, and being used in fluorescence observation of the specimen through said large-diameter objective lens, wherein:

an effective diameter of each of said dichroic mirror and said absorbing filter of said observation optical system in fluorescence observation of the specimen through said large-diameter objective lens is larger than that of said excitation filter of said reflected illumination optical system, and said large-diameter objective lens has an effective diameter that is substantially equal to the effective diameter of said absorbing filter, said ordinary objective lens has a mount screw diameter of W20.32, and said large-diameter objective lens has a mount screw diameter larger than that of said ordinary objective lens, said large-diameter objective lens has a numerical aperture 2 to 4 times larger than that of said ordinary objective lens, and said large-diameter objective lens has a parfocal distance larger than that of said ordinary objective lens.

2. The optical microscope according to claim 1, wherein said large-diameter objective lens has a numerical aperture 1.75 times larger than that of said ordinary objective lens.

3. The optical microscope according to claim 2, wherein:
said large-diameter objective lens has a magnification of 4× and a numerical aperture of 0.28, and
said ordinary objective lens has a numerical aperture of 0.16.

4. The optical microscope according to claim 3, wherein said objective lens switching means includes a mechanism which enables one of objective lenses having different mount lens diameters to be detachably inserted, and enables a height of a mount surface of each objective lens to be adjusted so as to maintain parfocal states in accordance with parfocal distances of said objective lenses.

5. The optical microscope according to claim 4, wherein:
said large-diameter objective lens has a parfocal distance of 60 mm, and
said ordinary objective lens has a parfocal distance of 45 mm.

6. The optical microscope according to claim 4, wherein said large-diameter objective lens has a mount screw diameter of 35 mm.

7. The optical microscope according to claim 4, wherein said objective lens switching means includes a slider.

8. The optical microscope according to claim 2, wherein:
said large-diameter objective lens has a magnification of 2× and has a numerical aperture of 0.14, and
said ordinary objective lens has a numerical aperture of 0.08.

9. The optical microscope according to claim 8, wherein said objective lens switching means has a mechanism which enables one of objective lenses having different mount lens diameters to be detachably inserted, and enables a height of a mount surface of each objective lens to be adjusted so as to maintain parfocal states in accordance with parfocal distances of said objective lenses.

10. The optical microscope according to claim 9, wherein:
said large-diameter objective lens has a parfocal distance of 60 mm, and
said ordinary objective lens has a parfocal distance of 45 mm.

11. The optical microscope according to claim 9, wherein said large-diameter objective lens has a mount screw diameter of 35 mm.

12. The optical microscope according to claim 9, wherein said objective lens switching means includes a slider.

13. The optical microscope according to claim 9, wherein said objective lens switching means includes a pivotal portion to be pivoted.

14. The optical microscope according to claim 9, wherein said objective lens switching means includes a revolver.

* * * * *

UNITED STATES PATENT AND TRADEMARK OFFICE
CERTIFICATE OF CORRECTION

PATENT NO. : 6,226,118 B1
DATED : May 1, 2001
INVENTOR(S) : Kenichi Koyama et al.

It is certified that error appears in the above-identified patent and that said Letters Patent is hereby corrected as shown below:

<u>Title page,</u>
Item [75], Inventors, change "Sagimihara;" to -- Sagamihara, --,
delete "Atsuhiro Tsuchiya, Hachioji; Masaru Fujiwara, Ina; Sadashi Adachi, Hachioji, all";

Item [30], Foreign Application Priority Data, delete
"Jul. 10, 1997 (JP) ......................... 9-185015".

Signed and Sealed this

Twenty-second Day of July, 2003

JAMES E. ROGAN
*Director of the United States Patent and Trademark Office*